US009365662B2

(12) United States Patent
Willis

(10) Patent No.: US 9,365,662 B2
(45) Date of Patent: Jun. 14, 2016

(54) METHOD FOR PRODUCING A SULFONATED BLOCK COPOLYMER COMPOSITION

(75) Inventor: Carl Lesley Willis, Houston, TX (US)

(73) Assignee: Kraton Polymers U.S. LLC, Houston, TX (US)

(*) Notice: Subject to any disclaimer, the term of this patent is extended or adjusted under 35 U.S.C. 154(b) by 1279 days.

(21) Appl. No.: 13/273,643

(22) Filed: Oct. 14, 2011

(65) Prior Publication Data

US 2012/0267248 A1 Oct. 25, 2012

Related U.S. Application Data

(60) Provisional application No. 61/394,112, filed on Oct. 18, 2010.

(51) Int. Cl.
C08F 8/36 (2006.01)

(52) U.S. Cl.
CPC .......................... C08F 8/36 (2013.01)

(58) Field of Classification Search
CPC .......... C08F 8/36; C08F 8/04; C08F 297/046
USPC ................................. 521/25, 28, 30
See application file for complete search history.

(56) References Cited

U.S. PATENT DOCUMENTS

| 2,854,425 A | 9/1958 | Bogel et al. |
| 3,281,257 A | 10/1966 | Shy |
| 3,450,795 A | 6/1969 | Langer |
| 3,577,357 A | 5/1971 | Winkler |
| RE27,145 E | 6/1971 | Jones |
| 3,595,952 A | 7/1971 | Wald et al. |
| 3,634,549 A | 1/1972 | Shaw et al. |
| 3,670,054 A | 6/1972 | De La Mare et al. |
| 3,682,768 A | 8/1972 | Adams et al. |
| 3,700,633 A | 10/1972 | Wald et al. |
| 3,735,559 A | 5/1973 | Salemme |
| 3,783,072 A | 1/1974 | Korpman |
| 3,985,830 A | 10/1976 | Fetters et al. |
| 4,039,593 A | 8/1977 | Kamienski et al. |
| 4,107,236 A | 8/1978 | Naylor et al. |
| 4,313,867 A | 2/1982 | Duvdevani |

(Continued)

FOREIGN PATENT DOCUMENTS

| CA | 716645 A | 8/1965 |
| CA | 2377553 A1 | 2/2001 |

(Continued)

OTHER PUBLICATIONS

International Search Report dated Feb. 7, 2012.

(Continued)

Primary Examiner — Arun S Phasge
(74) Attorney, Agent, or Firm — Novak Druce + Quigg, LLP; Leslie Streeter

(57) ABSTRACT

Sulfonated block copolymer composition formed by dissolving in an aprotic polar solvent at least one sulfonated block copolymer having at least one end block A and at least one interior block B wherein each A block contains essentially no sulfonic acid or sulfonate ester functional groups and each B block is a polymer block containing from about 10 to about 100 mol % sulfonic acid or sulfonate ester functional groups based on the number of sulfonation susceptible monomer units of the B block.

18 Claims, 4 Drawing Sheets

(56) References Cited

U.S. PATENT DOCUMENTS

| | | | |
|---|---|---|---|
| 4,365,023 A | 12/1982 | Fujimoto |
| 4,391,949 A | 7/1983 | St. Clair |
| 4,444,953 A | 4/1984 | St. Clair |
| 4,678,025 A | 7/1987 | Oberlander et al. |
| 4,766,161 A | 8/1988 | Chlanda et al. |
| 4,797,318 A | 1/1989 | Brooker et al. |
| 4,909,429 A | 3/1990 | Ankrom et al. |
| 4,931,070 A | 6/1990 | Prasad |
| 4,934,148 A | 6/1990 | Prasad et al. |
| 4,944,776 A | 7/1990 | Keyser et al. |
| 4,946,899 A | 8/1990 | Kennedy et al. |
| 5,095,094 A | 3/1992 | Brezin et al. |
| 5,145,748 A | 9/1992 | Gaidis et al. |
| 5,239,010 A | 8/1993 | Balas et al. |
| 5,288,773 A | 2/1994 | Gorbaty et al. |
| 5,340,387 A | 8/1994 | Smith |
| 5,348,691 A | 9/1994 | McElroy et al. |
| 5,389,711 A | 2/1995 | Westbrook et al. |
| 5,468,574 A | 11/1995 | Ehrenberg et al. |
| 5,516,831 A | 5/1996 | Pottick et al. |
| 5,620,500 A | 4/1997 | Fukui et al. |
| 5,677,074 A | 10/1997 | Serpico et al. |
| 5,679,482 A | 10/1997 | Ehrenberg et al. |
| 5,679,745 A | 10/1997 | Hamada et al. |
| 5,709,921 A | 1/1998 | Shawer |
| 5,785,117 A | 7/1998 | Grinbergs |
| 5,840,387 A | 11/1998 | Berlowitz-Tarrant et al. |
| 5,868,916 A | 2/1999 | Moulton |
| 5,925,621 A | 7/1999 | Zaneveld et al. |
| 6,017,433 A | 1/2000 | Mani |
| 6,028,115 A | 2/2000 | Zaneveld et al. |
| 6,033,804 A | 3/2000 | Doyle et al. |
| 6,145,588 A | 11/2000 | Martin et al. |
| 6,239,182 B1 | 5/2001 | Zaneveld et al. |
| 6,306,419 B1 | 10/2001 | Vachon et al. |
| 6,391,981 B1 | 5/2002 | Willis et al. |
| 6,413,298 B1 | 7/2002 | Wnek et al. |
| 6,444,767 B1 | 9/2002 | Schade et al. |
| 6,455,651 B1 | 9/2002 | Willis et al. |
| 6,484,887 B1 | 11/2002 | Fukutomi et al. |
| 6,492,469 B2 | 12/2002 | Willis et al. |
| 6,515,083 B2 | 2/2003 | Ozawa et al. |
| 6,536,514 B1 | 3/2003 | Sugiyama et al. |
| 6,537,538 B2 | 3/2003 | Zaneveld et al. |
| 6,579,948 B1 | 6/2003 | Tan et al. |
| 6,664,309 B2 | 12/2003 | Svenningsen et al. |
| 6,664,340 B1 | 12/2003 | Kaerki et al. |
| 6,686,423 B1 | 2/2004 | Desbois et al. |
| 6,699,941 B1 | 3/2004 | Handlin et al. |
| 6,703,446 B2 | 3/2004 | Schwindeman et al. |
| 6,716,777 B2 | 4/2004 | Lin |
| 6,767,976 B2 | 7/2004 | Hamada et al. |
| 6,777,082 B2 | 8/2004 | Patel et al. |
| 6,838,391 B2 | 1/2005 | Harle |
| 6,841,601 B2 | 1/2005 | Serpico et al. |
| 6,916,853 B2 * | 7/2005 | Curtin ................ C08J 3/16 521/25 |
| 6,932,619 B2 | 8/2005 | Chen |
| 7,029,559 B2 | 4/2006 | Won et al. |
| 7,060,788 B2 | 6/2006 | Hucks et al. |
| 7,152,670 B2 | 12/2006 | Dobbs et al. |
| 7,160,551 B2 | 1/2007 | McHugh et al. |
| 7,169,848 B2 | 1/2007 | Bening et al. |
| 7,188,666 B2 | 3/2007 | Lee et al. |
| 7,228,891 B2 | 6/2007 | Shin et al. |
| 7,231,967 B2 | 6/2007 | Haglid |
| 7,307,127 B1 | 12/2007 | Napadensky et al. |
| 7,309,522 B2 | 12/2007 | Webb et al. |
| 7,312,292 B2 | 12/2007 | Ravikiran |
| 7,320,361 B2 | 1/2008 | Arai et al. |
| 7,323,265 B2 | 1/2008 | Fan et al. |
| 7,598,337 B2 | 10/2009 | Hung et al. |
| 7,601,785 B2 | 10/2009 | Chang et al. |
| 7,737,224 B2 | 6/2010 | Willis et al. |
| 7,740,968 B2 | 6/2010 | Yamashita et al. |
| 7,754,844 B2 | 7/2010 | Sakaguchi et al. |
| 7,790,016 B2 | 9/2010 | Ur Rahman et al. |
| 7,807,759 B2 | 10/2010 | Shin et al. |
| 7,851,575 B2 | 12/2010 | Ravikiran |
| 7,977,713 B2 | 7/2011 | Sankin et al. |
| 8,012,539 B2 | 9/2011 | Handlin et al. |
| 2001/0053475 A1 | 12/2001 | Ying et al. |
| 2003/0049511 A1 | 3/2003 | Ritts et al. |
| 2003/0106680 A1 | 6/2003 | Serpico et al. |
| 2003/0129469 A1 | 7/2003 | Sun et al. |
| 2003/0198858 A1 | 10/2003 | Sun et al. |
| 2003/0228681 A1 | 12/2003 | Ritts et al. |
| 2004/0005490 A1 | 1/2004 | Fan et al. |
| 2004/0029014 A1 | 2/2004 | Hwang et al. |
| 2004/0101753 A1 | 5/2004 | Hwang |
| 2004/0137813 A1 | 7/2004 | Faucher |
| 2004/0142910 A1 | 7/2004 | Vachon et al. |
| 2004/0234851 A1 | 11/2004 | Kim et al. |
| 2005/0061381 A1 | 3/2005 | Hosoi |
| 2005/0133204 A1 | 6/2005 | Gates et al. |
| 2005/0266290 A1 | 12/2005 | Sun et al. |
| 2006/0154126 A1 | 7/2006 | Ritts et al. |
| 2007/0021569 A1 * | 1/2007 | Willis .................. B01D 71/80 525/314 |
| 2008/0085437 A1 | 4/2008 | Dean et al. |
| 2008/0124563 A1 | 5/2008 | Shima |
| 2008/0305251 A1 | 12/2008 | Fukuta et al. |
| 2009/0123804 A1 | 5/2009 | Yamashita et al. |
| 2009/0126370 A1 | 5/2009 | Tsai |
| 2009/0246593 A1 | 10/2009 | Nowatari et al. |
| 2009/0263699 A1 | 10/2009 | Sadasue et al. |
| 2009/0280255 A1 | 11/2009 | Handlin et al. |
| 2009/0314480 A1 | 12/2009 | Grinbergs et al. |
| 2010/0031817 A1 | 2/2010 | Ehrenberg et al. |
| 2010/0048817 A1 | 2/2010 | Dado et al. |
| 2010/0087783 A1 | 4/2010 | Weber et al. |
| 2010/0159353 A1 | 6/2010 | Ohgi et al. |
| 2010/0167100 A1 | 7/2010 | Moore et al. |
| 2010/0167159 A1 | 7/2010 | Ono et al. |
| 2010/0170776 A1 | 7/2010 | Ehrenberg et al. |
| 2010/0204403 A1 | 8/2010 | Willis et al. |
| 2010/0233569 A1 | 9/2010 | Ono et al. |
| 2010/0261799 A1 | 10/2010 | Vachon et al. |
| 2010/0264369 A1 | 10/2010 | Zhang |
| 2010/0273901 A1 | 10/2010 | Ehrenberg et al. |
| 2011/0230614 A1 | 9/2011 | Handlin et al. |
| 2011/0268901 A1 | 11/2011 | Handlin et al. |

FOREIGN PATENT DOCUMENTS

| | | |
|---|---|---|
| CA | 2616250 A1 | 1/2007 |
| CN | 101730679 A | 6/2010 |
| DE | 3930217 A1 | 3/1991 |
| DE | 19728686 C1 | 4/1999 |
| EP | 0763547 A1 | 3/1997 |
| FR | 2662604 A2 | 12/1991 |
| GB | 419604 A | 11/1934 |
| GB | 949126 A | 2/1956 |
| GB | 1019847 A | 10/1963 |
| GB | 1144167 A | 3/1969 |
| GB | 1336764 A | 11/1973 |
| GB | 1380411 A | 1/1975 |
| GB | 2066267 A | 7/1981 |
| GB | 2107325 A | 4/1983 |
| GB | 2168648 A | 6/1986 |
| GB | 2272220 A | 5/1994 |
| GB | 2399787 A | 9/2004 |
| GB | 2434762 A | 8/2007 |
| GB | 2444242 A | 6/2008 |
| JP | 53136082 A | 11/1978 |
| JP | 1256583 A | 10/1989 |
| JP | 1559652 C | 5/1990 |
| JP | 4053885 A | 2/1992 |
| JP | 5303918 A | 11/1993 |
| JP | 6000923 A | 1/1994 |
| JP | 7018237 A | 1/1995 |
| JP | 1910228 C | 3/1995 |
| JP | 1914163 C | 3/1995 |
| JP | 7060907 A | 3/1995 |

(56) References Cited

FOREIGN PATENT DOCUMENTS

| | | | |
|---|---|---|---|
| JP | 7082428 | A | 3/1995 |
| JP | 1926012 | C | 4/1995 |
| JP | 2549576 | B2 | 10/1996 |
| JP | 9074273 | A | 3/1997 |
| JP | 9078431 | A | 3/1997 |
| JP | 9094925 | A | 4/1997 |
| JP | 9156009 | A | 6/1997 |
| JP | 9217046 | A | 8/1997 |
| JP | 9235524 | A | 9/1997 |
| JP | 9277478 | A | 10/1997 |
| JP | 10061057 | A | 3/1998 |
| JP | 10110150 | A | 4/1998 |
| JP | 10158454 | A | 6/1998 |
| JP | 10298514 | A | 11/1998 |
| JP | 2837435 | B2 | 12/1998 |
| JP | 2843947 | B2 | 1/1999 |
| JP | 2868391 | B2 | 3/1999 |
| JP | 3704906 | B2 | 3/1999 |
| JP | 11080681 | A | 3/1999 |
| JP | 11158299 | A | 6/1999 |
| JP | 11199839 | A | 7/1999 |
| JP | 2000033671 | A | 2/2000 |
| JP | 2000038550 | A | 2/2000 |
| JP | 2000136367 | A | 5/2000 |
| JP | 2000318102 | A | 11/2000 |
| JP | 2000345120 | A | 12/2000 |
| JP | 2001020169 | A | 1/2001 |
| JP | 2001062968 | A | 3/2001 |
| JP | 3164554 | B2 | 5/2001 |
| JP | 3249005 | B2 | 1/2002 |
| JP | 2002338918 | A | 1/2002 |
| JP | 2004050612 | A | 2/2002 |
| JP | 2002105424 | A | 4/2002 |
| JP | 3326195 | B2 | 9/2002 |
| JP | 3338179 | B2 | 10/2002 |
| JP | 3358391 | B2 | 12/2002 |
| JP | 3370198 | B2 | 1/2003 |
| JP | 3411068 | B2 | 5/2003 |
| JP | 3484840 | B2 | 1/2004 |
| JP | 3515740 | B2 | 4/2004 |
| JP | 2004121828 | A | 4/2004 |
| JP | 2004136480 | A | 5/2004 |
| JP | 3660771 | B2 | 6/2005 |
| JP | 2006021959 | A | 1/2006 |
| JP | 3787935 | B2 | 6/2006 |
| JP | 2007001086 | A | 1/2007 |
| JP | 3887341 | B2 | 2/2007 |
| JP | 2007105134 | A | 4/2007 |
| JP | 2007126512 | A | 5/2007 |
| JP | 3940952 | B2 | 7/2007 |
| JP | 3967842 | B2 | 8/2007 |
| JP | 2007238746 | A | 9/2007 |
| JP | 2008073888 | B2 | 4/2008 |
| JP | 2008127447 | A | 6/2008 |
| JP | 2009143998 | A | 7/2009 |
| JP | 4327040 | B2 | 9/2009 |
| JP | 4414016 | B2 | 2/2010 |
| JP | 2010085585 | A | 4/2010 |
| JP | 2010106090 | A | 5/2010 |
| JP | 4544563 | B2 | 9/2010 |
| KR | 20020076825 | A | 10/2002 |
| KR | 20040013555 | A | 2/2004 |
| WO | 9821773 | A1 | 5/1998 |
| WO | 0109239 | A1 | 2/2001 |
| WO | 0272242 | A1 | 1/2002 |
| WO | 03050896 | A3 | 10/2002 |
| WO | 03050897 | A3 | 10/2003 |
| WO | 2004004688 | A1 | 1/2004 |
| WO | 2004051172 | A1 | 6/2004 |
| WO | 2004032306 | A3 | 7/2004 |
| WO | 2004070312 | A1 | 8/2004 |
| WO | 2007010039 | A1 | 1/2007 |
| WO | 2007010042 | A1 | 1/2007 |
| WO | 2008030939 | A3 | 7/2008 |
| WO | 2008089332 | A3 | 7/2008 |
| WO | 2008151870 | A2 | 12/2008 |
| WO | 2009137678 | A1 | 11/2009 |
| WO | 2008141179 | A1 | 11/2010 |
| WO | 2011065460 | A1 | 6/2011 |

OTHER PUBLICATIONS

English abstract and machine translation of description from Espacenet for WO2008151870; published on Dec. 18, 2008 and retrieved on Sep. 30, 2014.

G.W. Coates, P.D. Hustad and S. Reinartz, Angew Chem. Int. Ed., 41, 2236-2257 (2002).

H. Zhang and K. Nomura, J. A. Chem. Soc., Comm., 2005.

C.J. Hawker, A.W. Bosman and E. Harth, Chem. Rev., 101(12), 3661-3688 (2001).

* cited by examiner

METHOD FOR PRODUCING A SULFONATED BLOCK COPOLYMER COMPOSITION

CROSS-REFERENCE TO RELATED APPLICATIONS

The present application claims priority to provisional application 61/394,112, filed Oct. 18, 2010, which is hereby incorporated by reference in its entirety.

FIELD OF THE DISCLOSURE

The present disclosure generally relates to a method for preparing sulfonated block copolymer compositions. In particular, the disclosure describes a method for preparing sulfonated block copolymers in aprotic polar organic solvents and membranes cast from such solutions. Further described is the formation of inverted micellular solutions of sulfonated block copolymers. Membranes described herein formed from sulfonated block copolymer compositions have high water transport, low water uptake, high ion flux, and good mechanical strength in the presence of water, and are therefore useful in a wide variety of applications including electrodialysis.

BACKGROUND OF THE DISCLOSURE

It is known that thermoplastic elastomers can be formed having chemically different polymer blocks for providing various desirable properties. In one common form, styrenic block copolymers (SBCs) can be formed having internal blocks of conjugated diene and external blocks having aromatic alkenyl arene. The elastomeric properties of internal conjugated diene blocks along with the "harder" aromatic alkenyl arenes external blocks together provide the resulting block copolymer distinctive properties for use in a large variety of applications.

It is also known that SBC's can be functionalized with functional groups such as sulfonic acid in order to further modify their characteristics. One of the first such sulfonated block copolymers is disclosed, for example, in U.S. Pat. No. 3,577,357 to Winkler. The resulting block copolymer was characterized as having the general configuration A-B-(B-A)$_{1-5}$, wherein each A is a non-elastomeric sulfonated monovinyl arene polymer block and each B is a substantially saturated elastomeric alpha-olefin polymer block, said block copolymer being sulfonated to an extent sufficient to provide at least 1% by weight of sulfur in the total polymer and up to one sulfonated constituent for each monovinyl arene unit. The sulfonated polymers could be used as such, or could be used in the form of their acid, alkali metal salt, ammonium salt or amine salt. According to Winkler, a polystyrene-hydrogenated polyisoprene-polystyrene triblock copolymer was treated with a sulfonating agent comprising sulfur trioxide/triethyl phosphate in 1,2-dichloroethane. The products are described as having water absorption characteristics that might be useful in water purification membranes and the like.

More recently, U.S. Pat. No. 7,737,224 to Willis et al. disclosed the preparation of sulfonated polymer and inter alia illustrated a sulfonated block copolymer that is solid in water comprising at least two polymer end blocks and at least one saturated polymer interior block wherein each end block is a polymer block resistant to sulfonation and each interior block is a saturated polymer block susceptible to sulfonation, and wherein the interior blocks are sulfonated to the extent of 10 to 100 mol percent. The sulfonated block copolymers are described as having a high water vapor transport rate while at the same time having good dimensional stability and strength in the presence of water, and as being therefore valuable for many end use applications, especially where the combination of good wet strength, good water and proton transport characteristics, good methanol resistance, easy film or membrane formation, barrier properties, control of flexibility and elasticity, adjustable hardness, and thermal/oxidative stability are important.

Additionally, US 2010/0048817A1 to Dado et al. discloses a process for preparing sulfonated block copolymers illustrating, e.g., a process which involves providing a precursor block copolymer having at least one end block A and at least one interior block B wherein each A block is a polymer block resistant to sulfonation and each B block is a polymer block susceptible to sulfonation wherein said A and B blocks are substantially free of olefinic unsaturation; and reacting the precursor block copolymer with an acyl sulfate in a reaction mixture further comprising at least one non-halogenated aliphatic solvent to form a sulfonated block polymer.

In particular, Dado et al. disclose that the solvents used for the preparation of the sulfonated block copolymer include a first non-halogenated solvent, the most preferred being cylcohexane, methylcyclohexane, and a second non-halogenated solvent which is chosen such that it is miscible with the first solvent, but is a poor solvent for the sulfonation susceptible block, the most preferred being n-heptane. The product obtained in the process is described as comprising sulfonated polymer micelles and/or other polymer aggregates of definable size and distribution, as would be characteristic of polymer micelle structures.

SUMMARY OF THE INVENTION

The present technology provides for a sulfonated block copolymer composition having exceptionally high water vapor transport rates, very good dimensional stability and tensile strength even in wet environments. These are also achieved even with relatively low ionic exchange capacities of sulfonic acid functionality. It was also surprisingly found that membranes made up of such copolymer compositions have exceptionally good conductivity, and high selectivity useful for such applications as electrodialysis.

Accordingly, in some embodiments, is disclosed a solution having an inverted micelle sulfonated block copolymer composition including:

at least one sulfonated block copolymer having at least one end block A and at least one interior block B wherein each A block contains essentially no sulfonic acid or sulfonate ester functional groups and each B block is a polymer block containing from about 10 to about 100 mol % sulfonic acid or sulfonate ester functional groups based on the number of sulfonation susceptible monomer units of the B block, the sulfonated block copolymer being dissolved in an aprotic polar solvent, and wherein the sulfonated block copolymer is arranged in an inverted micelle structure having the sulfonic acid or sulfonate ester segments of the sulfonated block copolymer on the exterior of said micelle structure and the non-polar segments of the sulfonated block copolymer on the interior of the micelle structure.

In further embodiments, the concentration of the sulfonated block copolymer in the solution is less than 15 wt %. In additional embodiments the aprotic polar solvent is a compound containing at least one nitrogen atom. In further embodiments, the ion exchange capacity is about 1.6 meq/g or less. Additionally, in further embodiments, membranes formed from the sulfonated block copolymer solution have a moisture vapor transmission rate of 20 liters/m²/day or more and a water uptake of less than 50%.

In further embodiments, membranes formed from such sulfonated block copolymer compositions can be used in electrodialytic cells.

The sulfonated block copolymers may also have a general configuration A-B-A, A-B-A-B-A, (A-B-A)$_n$X, (A-B)$_n$X, A-D-B-D-A, A-B-D-B-A, (A-D-B)$_n$X, (A-B-D)$_n$X or mixtures thereof, where n is an integer from 2 to about 30, and X is a coupling agent residue and wherein each D block is a polymer block resistant to sulfonation and the plurality of A blocks, B blocks, or D blocks are the same or different. Additionally, each D block of the sulfonated block copolymer is selected from the group consisting of (i) a polymerized or copolymerized conjugated diene selected from isoprene, 1,3-butadiene having a vinyl content prior to hydrogenation of between 20 and 80 mol percent, (ii) a polymerized acrylate monomer, (iii) a silicon polymer, (iv) polymerized isobutylene and (v) mixtures thereof, wherein any segments containing polymerized 1,3-butadiene or isoprene are subsequently hydrogenated.

In additional embodiments, there is disclosed herein a sulfonated block copolymer composition formed by the process of:

dissolving in an aprotic polar solvent a sulfonated block copolymer having at least one end block A and at least one interior block B wherein each A block contains essentially no sulfonic acid or sulfonate ester functional groups and each B block is a polymer block containing from about 10 to about 100 mol % sulfonic acid or sulfonate ester functional groups based on the number of sulfonation susceptible monomer units of the B block, wherein the sulfonated block copolymer in the solvent is arranged in an inverted micelle structure having the sulfonic acid or sulfonate ester segments of the sulfonated block copolymer on the exterior of the micelle structure and the non-polar segments of the sulfonated block copolymer on the interior of the micelle structure.

In additional embodiments, the sulfonated block copolymer composition in dissolved in the aprotic polar solvent by heating the sulfonated block copolymer and the aprotic polar solvent at a temperature ranging from 40° C. to the boiling point of the aprotic polar solvent.

In further embodiments, the aprotic polar solvent is a compound containing at least one nitrogen and preferably an amide. Additional specific solvents can includes N,N-dimethylformamide (DMF), N,N-dimethylacetamide (DMA), N-methyl-2-pyrrolidone (NMP).

Additional embodiments disclosed herein include a method for forming a sulfonated block copolymer composition including:

dissolving in an aprotic polar solvent a sulfonated block copolymer with a non-inverted micelle structure having at least one end block A and at least one interior block B wherein each A block contains essentially no sulfonic acid or sulfonate ester functional groups and each B block is a polymer block containing from about 10 to about 100 mol % sulfonic acid or sulfonate ester functional groups based on the number of sulfonation susceptible monomer units of the B block, wherein the sulfonated block copolymer in the solvent is arranged in an inverted micelle structure having the sulfonic acid or sulfonate ester segments of the sulfonated block copolymer on the exterior of the micelle structure and the non-polar segments of the sulfonated block copolymer on the interior of the micelle structure.

Additional embodiments disclosed herein include a sulfonated block copolymer composition having:

at least one end block A and at least one interior block B wherein each A block contains essentially no sulfonic acid or sulfonate ester functional groups and each B block is a polymer block and having an Ionic Exchange capacity of less than 1.5, and wherein the block copolymer has a moisture transmission rate greater than about 20 liters/m²/day according to a modified ASTM E96BW.

Additional embodiments disclosed herein include an electrodialytic cell having:

at least one anode and at least one cathode, a polymer composition having at least one end block A and at least one interior block B wherein each A block contains essentially no sulfonic acid or sulfonate ester functional groups and each B block is a polymer block and having an Ionic Exchange Capacity (IEC) of less than 2.5, and wherein the block copolymer has a conductivity of at least 1.0 mS/cm.

Figure 1:
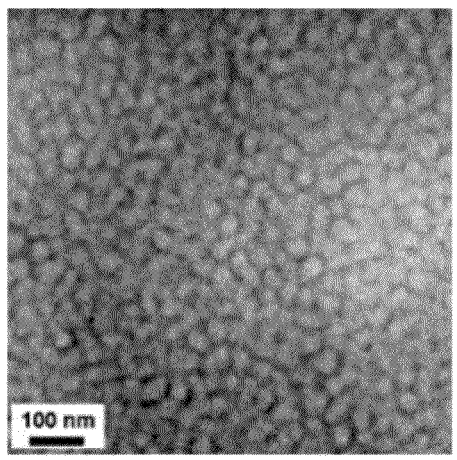
FIG. 1 illustrates a micrograph of a sulfonated block copolymer A-2.0 dried solution from dimethyl acetamide (DMA) at 1% wt.

For the above, both polymers A-2.0 and A-1.5 are shown and discussed in the Examples section herein.

DETAILED DESCRIPTION OF THE INVENTION

A detailed description of embodiments of the present invention is disclosed herein; however, it is to be understood that the disclosed embodiments are merely exemplary of the invention and that the invention may be embodied in various and alternative forms of the disclosed embodiments. Therefore, specific structural and functional details which are addressed in describing the embodiments herein are not to be interpreted as limiting, but merely as a basis for the claims and as a representative basis for teaching one skilled in the art to variously employ the present invention.

Unless specifically stated otherwise, all technical terms used herein have the meaning as commonly understood by those skilled in the art.

Moreover, unless specifically stated otherwise, the following expressions as used herein are understood to have the following meanings.

The expression "equilibrium" as used herein in the context of water absorption refers to the state in which the rate of water absorption by a block copolymer is in balance with the rate of water loss by the block copolymer. The state of equilibrium can generally be reached by immersing a sulfonated block copolymer of the present invention in water for a 24 hour period (one day). The equilibrium state may be reached also in other wet environments, however the period of time to reach equilibrium may differ.

The expression "hydrated" block copolymer as used herein refers to a block copolymer which has absorbed a significant amount of water.

The expression "aprotic" as used herein refers to a solvent which cannot donate a hydrogen atom, for example an O—H group, N—H group or S—H group.

The expression "wet state" as used herein refers to the state at which a block copolymer has reached equilibrium or has been immersed in water for a period of 24 hours.

The expression "dry state" as used herein refers to the state of a block copolymer which has absorbed essentially no or only insignificant amounts of water. For example, a sulfonated block copolymer which is merely in contact with the atmosphere will generally remain in the dry state.

The expression "water uptake value" as used herein refers to the weight of water which is absorbed by a block copolymer in equilibrium as compared to the original weight of the dry material, and is calculated as a percentage. A lower water uptake value indicates that less water has been absorbed and therefore corresponds to a better dimensional stability.

The expression "ion flux" refers to the ability of the sulfonated block copolymers membranes to transport ions.

The expression "inverted micelle" refers herein to a sulfonated block copolymer composition dissolved in a solvent configured such that the polar sulfonated segments are arranged on the exterior (corona) of the micelle, while the non-polar non-sulfonated segments are arranged in the interior (core) of the micelle.

All publications, patent applications, and patents mentioned herein are incorporated by reference in their entirety. In the event of conflict, the present specification, including definitions, is intended to control.

Further, all ranges disclosed herein are intended to include any combination of the mentioned upper and lower limits even if the particular combination and range is not specifically listed.

According to several embodiments of the present disclosure, it has been surprisingly found that a sulfonated block copolymer composition can be dissolved in an aprotic polar solvent to form an inverted micellular structure. Namely, when dissolved in such a solution, the sulfonated segments of the polymer arrange themselves to the exterior of the micelle, and where the non-sulfonated segments arrange themselves to the interior of the micelle. When cast to a film or membrane, superior properties are obtained, even at low Ionic exchange capacities (meq/g sulfonic acid functionality). The particular properties include, but are not limited to:

(1) An exceptionally high water vapor transport rate;
(2) Dimensional stability under wet conditions, as evidenced by low water uptake values and low swelling;
(3) Good tensile strength in the wet state Additional exceptional properties relate to use in electrically driven processes:

(1) High ion flux
(2) Good conductivity
(3) High selectivity
(4) Excellent dimensional stability In some embodiments, the sulfonated block copolymers used herein for dissolution in aprotic polar solvents and casting therefrom are described as in U.S. Pat. No. 7,737,224 to Willis et al, the entire disclosure of which is incorporated herein by reference. Furthermore, the sulfonated block polymers as described in U.S. Pat. No. 7,737,224 may be prepared according to the process of WO 2008/089332 to Dado et al. or WO 2009/137678 to Handlin et al., the entire disclosures of which are hereby incorporated by reference.

1. Sulfonated Block Copolymers

The block copolymers for the preparation of the sulfonated block copolymers may be made by a number of different processes, including anionic polymerization, moderated anionic polymerization, cationic polymerization, Ziegler-Natta polymerization, and living chain or stable free radical polymerization. Anionic polymerization is described below in more detail, and in the referenced documents. Moderated anionic polymerization processes for making styrenic block copolymers are disclosed, for example, in U.S. Pat. No. 6,391,981, U.S. Pat. No. 6,455,651 and U.S. Pat. No. 6,492,469, each of which is incorporated herein by reference. Cationic polymerization processes for preparing block copolymers are disclosed, for example, in U.S. Pat. No. 6,515,083 and U.S. Pat. No. 4,946,899, each of which is incorporated herein by reference.

Living Ziegler-Natta polymerization processes that can be used to make block copolymers were recently reviewed by G. W. Coates, P. D. Hustad, and S. Reinartz in Angew. Chem. Int. Ed., 41, 2236-2257 (2002); a subsequent publication by H. Zhang and K. Nomura (J. Am. Chem. Soc., Comm., 2005) describe living Ziegler-Natta techniques for making styrenic block copolymers specifically. The extensive work in the field of nitroxide mediated living radical polymerization chemistry has been reviewed; see C. J. Hawker, A. W. Bosman, and E. Harth, Chem. Rev., 101(12), 3661-3688 (2001). As outlined in this review, styrenic block copolymers can be synthesized by living or stable free radical techniques. Nitroxide mediated polymerization methods are preferred living chain or stable free radical polymerization processes when preparing the precursor polymers.

2. Polymer Structure

One aspect of the disclosure relates to the polymer structure of the sulfonated block copolymers. In one embodiment, the sulfonated block copolymers have at least two polymer end or outer blocks A and at least one saturated polymer interior block B wherein each A block is a polymer block which is resistant to sulfonation and each B block is a polymer block which is susceptible to sulfonation.

Preferred structures have the general configuration A-B-A, $(A-B)_n(A)$, $(A-B-A)_n$, $(A-B-A)_nX$, $(A-B)_nX$, A-B-D-B-A, A-D-B-D-A, $(A-D-B)_n(A)$, $(A-B-D)_n(A)$, $(A-B-D)_nX$, $(A-D-B)_nX$ or mixtures thereof, where n is an integer from 2 to about 30, X is coupling agent residue and A, B and D are as defined hereinbelow.

Most preferred structures are linear structures such as A-B-A, $(A-B)_2X$, A-B-D-B-A, $(A-B-D)_2X$, A-D-B-D-A, and $(A-D-B)_2X$, and radial structures such as $(A-B)_nX$ and $(A-D-B)_nX$ where n is 3 to 6. Such block copolymers are typically made via anionic polymerization, stable free radical polymerization, cationic polymerization or Ziegler-Natta polymerization. Preferably, the block copolymers are made via anionic polymerization. It will be understood by those skilled in the art that in any polymerization, the polymer mixture will include a certain amount of A-B diblock copolymer, in addition to any linear and/or radial polymers. The respective amounts have not been found to be detrimental to the practice of the invention.

The A blocks are one or more segments selected from polymerized (i) para-substituted styrene monomers, (ii) ethylene, (iii) alpha olefins of 3 to 18 carbon atoms; (iv) 1,3-cyclodiene monomers, (v) monomers of conjugated dienes having a vinyl content less than 35 mol percent prior to hydrogenation, (vi) acrylic esters, (vii) methacrylic esters, and (viii) mixtures thereof. If the A segments are polymers of 1,3-cyclodiene or conjugated dienes, the segments will be hydrogenated subsequent to polymerization of the block copolymer and before sulfonation of the block copolymer.

The para-substituted styrene monomers are selected from para-methylstyrene, para-ethylstyrene, para-n-propylstyrene, para-iso-propylstyrene, para-n-butylstyrene, para-sec-butylstyrene, para-iso-butylstyrene, para-t-butylstyrene, isomers of para-decylstyrene, isomers of para-dodecylstyrene and mixtures of the above monomers. Preferred para-substituted styrene monomers are para-t-butylstyrene and para-methylstyrene, with para-t-butylstyrene being most preferred. Monomers may be mixtures of monomers, depending on the particular source. It is desired that the overall purity of the para-substituted styrene monomers be at least 90%-wt., preferably at least 95%-wt., and even more preferably at least 98%-wt. of the desired para-substituted styrene monomer.

When the A blocks are polymer segments of ethylene, it may be useful to polymerize ethylene via a Ziegler-Natta process, as taught in the references in the review article by G. W. Coates et al, as cited above, which disclosure is herein incorporated by reference. It is preferred to make the ethylene blocks using anionic polymerization techniques as taught in U.S. Pat. No. 3,450,795, which disclosure is herein incorporated by reference. The block molecular weight for such ethylene blocks will typically be between about 1,000 and about 60,000.

When the A blocks are polymers of alpha olefins of 3 to 18 carbon atoms, such polymers are prepared by via a Ziegler-Natta process, as taught in the references in the above-cited review article by G. W. Coates et al. Preferably, the alpha-olefins are propylene, butylene, hexane or octane, with propylene being most preferred. The block molecular weight for each of such alpha-olefin blocks typically is between about 1,000 and about 60,000.

When the A blocks are hydrogenated polymers of 1,3-cyclodiene monomers, such monomers are selected from the group consisting of 1,3-cyclohexadiene, 1,3-cycloheptadiene and 1,3-cyclooctadiene. Preferably, the cyclodiene monomer is 1,3-cyclohexadiene. Polymerization of such cyclodiene monomers is disclosed in U.S. Pat. No. 6,699,941, which disclosure is herein incorporated by reference. It will be necessary to hydrogenate the A blocks when using cyclodiene monomers since non-hydrogenated polymerized cyclodiene blocks are susceptible to sulfonation. Accordingly, after synthesis of the A block with 1,3-cyclodiene monomers, the block copolymer will be hydrogenated.

When the A blocks are hydrogenated polymers of conjugated acyclic dienes having a vinyl content less than 35 mol percent prior to hydrogenation, it is preferred that the conjugated diene is 1,3-butadiene. It is necessary that the vinyl content of the polymer prior to hydrogenation be less than 35 mol percent, preferably less than 30 mol percent. In certain embodiments, the vinyl content of the polymer prior to hydrogenation will be less than 25 mol percent, even more preferably less than 20 mol percent, and even less than 15 mol percent with one of the more advantageous vinyl contents of the polymer prior to hydrogenation being less than 10 mol percent. In this way, the A blocks will have a crystalline structure, similar to that of polyethylene. Such A block structures are disclosed in U.S. Pat. No. 3,670,054 and in U.S. Pat. No. 4,107,236, each of which disclosures is herein incorporated by reference.

The A blocks may also be polymer segments of acrylic esters or methacrylic esters. Such polymer blocks may be made according to the methods disclosed in U.S. Pat. No. 6,767,976, which disclosure is herein incorporated by reference. Specific examples of the methacrylic ester include esters of a primary alcohol and methacrylic acid, such as methyl methacrylate, ethyl methacrylate, propyl methacrylate, n-butyl methacrylate, isobutyl methacrylate, hexyl methacrylate, 2-ethylhexyl methacrylate, dodecyl methacrylate, lauryl methacrylate, methoxyethyl methacrylate, dimethylaminoethyl methacrylate, diethylaminoethyl methacrylate, glycidyl methacrylate, trimethoxysilylpropyl methacrylate, trifluoromethyl methacrylate, trifluoroethyl methacrylate; esters of a secondary alcohol and methacrylic acid, such as isopropyl methacrylate, cyclohexyl methacrylate and isobornyl methacrylate; and esters of a tertiary alcohol and methacrylic acid, such as tert-butyl methacrylate. Specific examples of the acrylic ester include esters of a primary alcohol and acrylic acid, such as methyl acrylate, ethyl acrylate, propyl acrylate, n-butyl acrylate, isobutyl acrylate, hexyl acrylate, 2-ethylhexyl acrylate, dodecyl acrylate, lauryl acrylate, methoxyethyl acrylate, dimethylaminoethyl acrylate, diethylaminoethyl acrylate, glycidyl acrylate, trimethoxysilylpropyl acrylate, trifluoromethyl acrylate, trifluoroethyl acrylate; esters of a secondary alcohol and acrylic acid, such as isopropyl acrylate, cyclohexyl acrylate and isobornyl acrylate; and esters of a tertiary alcohol and acrylic acid, such as tert-butyl acrylate. If necessary, as raw material or raw materials, one or more of other anionic polymerizable monomers may be used together with the (meth)acrylic ester. Examples of the anionic polymerizable monomer that can be optionally used include methacrylic or acrylic monomers such as trimethylsilyl methacrylate, N-,N-dimethyl-methacrylamide, N,N-diisopropylmethacrylamide, N,N-diethylmethacrylamide, N,N-methylethylmethacrylamide, N,N-di-tert-butylmethacrylamide, trimethylsilyl acrylate, N,N-dimethylacrylamide, N,N-di-isopropylacrylamide, N,N-methylethylacrylamide and N,N-di-tert-butylacrylamide. Moreover, there may be used a multifunctional anionic polymerizable monomer having in the molecule thereof two or more methacrylic or acrylic structures, such as methacrylic ester structures or acrylic ester structures (for example, ethylene glycol diacrylate, ethylene glycol dimethacrylate, 1,4-butanediol diacrylate, 1,4-butanediol dimethacrylate, 1,6-hexanediol diacrylate, 1,6-hexanediol di methacrylate, trimethylolpropane triacrylate and trimethylolpropane trimethacrylate).

In the polymerization processes used to make the acrylic or methacrylic ester polymer blocks, only one of the monomers, for example, the (meth)acrylic ester may be used, or two or more thereof may be used in combination. When two or more of the monomers are used in combination, any copolymerization form selected from random, block, tapered block and the like copolymerization forms may be effected by selecting conditions such as a combination of the monomers and the timing of adding the monomers to the polymerization system (for example, simultaneous addition of two or more monomers, or separate additions at intervals of a given time).

The A blocks may also contain up to 15 mol percent of the vinyl aromatic monomers such as those present in the B blocks which are addressed in more detail in the following. In some embodiments, the A blocks may contain up to 10 mol percent, preferably they will contain only up to 5 mol percent, and particularly preferably only up to 2 mol percent of the vinyl aromatic monomers as mentioned for the B blocks. However, in the most preferred embodiments, the A blocks will contain no vinyl monomers as present in the B blocks. The sulfonation level in the A blocks may be from 0 up to 15 mol percent of the total monomers in the A block. It will be understood by those skilled in the art that suitable ranges include any combination of the specified mol percents even if the specific combination and range is not listed herewith.

The B blocks, in each case, comprises segments of one or more polymerized vinyl aromatic monomers selected from unsubstituted styrene monomer, ortho-substituted styrene monomers, meta-substituted styrene monomers, alpha-methylstyrene monomer, 1,1-diphenylethylene monomer, 1,2-diphenylethylene monomer, and mixtures thereof. In addition to the monomers and polymers mentioned above, the B blocks may also comprise a partially or completely hydrogenated copolymer of such monomer(s) with a conjugated diene selected from 1,3-butadiene, isoprene and mixtures thereof, having a vinyl content of between 20 and 80 mol percent. These copolymers with partially or completely hydrogenated dienes may be random copolymers, tapered copolymers, block copolymers or controlled distribution copolymers. In one preferred embodiment, the B blocks are selectively partially or completely hydrogenated and comprise a copolymer of conjugated dienes and the vinyl aromatic monomers noted in this paragraph. In another preferred embodiment, the B blocks are unsubstituted styrene monomer blocks which are saturated by virtue of the nature of the monomer and do not require the added process step of hydrogenation. The B blocks having a controlled distribution structure are disclosed in U.S. Pat. No. 7,169,848, which disclosure is herein incorporated by reference. U.S. Pat. No. 7,169,848 also discloses the preparation of sulfonated block copolymers. The B blocks comprising a styrene block are described herein. In a preferred embodiment, the B blocks are made up of unsubstituted styrene and will not require a separate hydrogenation step.

In another aspect of the present disclosure, the block copolymer includes at least one impact modifier block D having a glass transition temperature less than 20° C. In one embodiment, the impact modifier block D comprises a hydrogenated polymer or copolymer of a conjugated diene selected from isoprene, 1,3-butadiene and mixtures thereof the butadiene portion of the polymer block having a vinyl content prior to hydrogenation of between 20 and 80 mol percent and the polymer block having a number average molecular weight of between 1,000 and 50,000. Providing such a D block can assist in in making a block copolymer less rigid and more elastomeric.

In another embodiment, the impact modifier block D comprises an acrylate or silicone polymer having a number average molecular weight of 1,000 to 50,000. In still another embodiment, the impact modifier block D block is a polymer block of isobutylene having a number average molecular weight of 1,000 to 50,000.

Each A block independently has a number average molecular weight between about 1,000 and about 60,000 and each B block independently has a number average molecular weight between about 10,000 and about 300,000. Preferably each A block has a number average molecular weight of between 2,000 and 50,000, more preferably between 3,000 and 40,000 and even more preferably between 3,000 and 30,000. Preferably each B block has a number average molecular weight of between 15,000 and 250,000, more preferably between 20,000 and 200,000, and even more preferably between 30,000 and 100,000. It will be understood by those skilled in the art that suitable ranges include any combination of the specified number average molecular weights even if the specific combination and range is not listed herewith. These molecular weights are most accurately determined by light scattering measurements, and are expressed as number average molecular weight. Preferably, the sulfonated polymers have from about 8 mol percent to about 80 mol percent, preferably from about 10 to about 60 mol percent A blocks, more preferably more than 15 mol percent A blocks and even more preferably from about 20 to about 50 mol percent A blocks.

The relative amount of vinyl aromatic monomers which are unsubstituted styrene monomer, ortho-substituted styrene monomer, meta-substituted styrene monomer, alpha-methylstyrene monomer, 1,1-diphenylethylene monomer, and 1,2-diphenylethylene monomer in the sulfonated block copolymer is from about 5 to about 90 mol percent, preferably from about 5 to about 85 mol percent. In alternative embodiments, the amount is from about 10 to about 80 mol percent, preferably from about 10 to about 75 mol percent, more preferably from about 15 to about 75 mol percent, with the most preferred being from about 25 to about 70 mol percent. It will be understood by those skilled in the art that suitable ranges include any combination of the specified mol percents even if the specific combination is not listed herewith.

In a preferred embodiment, the mol percent of vinyl aromatic monomers which are unsubstituted styrene monomer, ortho-substituted styrene monomer, meta-substituted styrene monomer, alpha-methylstyrene monomer, 1,1-diphenylethylene monomer, and 1,2-diphenylethylene monomer in each B block is from about 10 to about 100 mol percent, preferably from about 25 to about 100 mol percent, more preferably from about 50 to about 100 mol percent, even more preferably from about 75 to about 100 mol percent and most preferably 100 mol percent. It will be understood by those skilled in the art that suitable ranges include any combination of the specified mol percents even if the specific combination and range is not listed herewith.

Typical levels of sulfonation are such that each B block contains one or more sulfonic functional groups. Preferred levels of sulfonation are 10 to 100 mol percent based on the mol percent of vinyl aromatic monomers which are unsubstituted styrene monomer, ortho-substituted styrene monomer, meta-substituted styrene monomer, alpha-methylstyrene monomer, 1,1-diphenylethylene monomer, and 1,2-diphenylethylene monomer in each B block, more preferably about 20 to 95 mol percent and even more preferably about 30 to 90 mol percent. It will be understood by those skilled in the art that suitable ranges of sulfonation include any combination of the specified mol percents even if the specific combination and range is not listed herewith. The level of sulfonation is determined by titration of a dry polymer sample, which has been re-dissolved in tetrahydrofuran with a standardized solution of NaOH in a mixed alcohol and water solvent.

3. Overall Anionic Process to Prepare Polymers

The anionic polymerization process comprises polymerizing the suitable monomers in solution with a lithium initiator. The solvent used as the polymerization vehicle may be any hydrocarbon that does not react with the living anionic chain end of the forming polymer, is easily handled in commercial polymerization units, and offers the appropriate solubility characteristics for the product polymer. For example, non-polar aliphatic hydrocarbons, which are generally lacking in ionizable hydrogen atoms make particularly suitable solvents. Frequently used are cyclic alkanes, such as cyclopentane, cyclohexane, cycloheptane, and cyclooctane, all of which are relatively non-polar. Other suitable solvents will be known to those skilled in the art and can be selected to perform effectively in a given set of process conditions, with polymerization temperature being one of the major factors taken into consideration.

Starting materials for preparing the block copolymers of the present invention include the initial monomers noted above. Other important starting materials for anionic co-polymerizations include one or more polymerization initiators. In the present invention such include, for example, alkyl lithium compounds such as s-butyllithium, n-butyllithium, t-butyllithium, amyllithium and the like and other organo lithium compounds including di-initiators such as the di-sec-butyl lithium adduct of m-diisopropenyl benzene. Other such di-initiators are disclosed in U.S. Pat. No. 6,492,469, which is incorporated herein by reference. Of the various polymerization initiators, s-butyllithium is preferred. The initiator can be used in the polymerization mixture (including monomers and solvent) in an amount calculated on the basis of one initiator molecule per desired polymer chain. The lithium initiator process is well known and is described in, for example, U.S. Pat. No. 4,039,593 and U.S. Pat. No. Re. 27,145, each of which disclosures is incorporated herein by reference.

Polymerization conditions to prepare the block copolymers of the present invention are typically similar to those used for anionic polymerizations in general. In the present invention polymerization is preferably carried out at a temperature of from about −30° C. to about 150° C., more preferably about 10° C. to about 100° C., and most preferably, in view of industrial limitations, from about 30° C. to about 90° C. The polymerization is carried out in an inert atmosphere, preferably nitrogen, and may also be accomplished under pressure within the range of from about 0.5 to about 10 bars. This copolymerization generally requires less than about 12 hours, and can be accomplished in from about 5 minutes to about 5 hours, depending upon the temperature, the concentration of the monomer components, and the molecular weight of the polymer that is desired. When two or more of the monomers are used in combination, any copolymerization form selected from random, block, tapered block, controlled distribution block, and the like copolymerization forms may be utilized.

It will be understood by those skilled in the art that the anionic polymerization process may be moderated by the addition of a Lewis acid, such as an aluminum alkyl, a magnesium alkyl, a zinc alkyl or combinations thereof. The effects of the added Lewis acid on the polymerization process are 1) to lower the viscosity of the living polymer solution allowing for a process that operates at higher polymer concentrations and thus uses less solvent,
2) to enhance the thermal stability of the living polymer chain end which permits polymerization at higher temperatures and again, reduces the viscosity of the polymer solution allowing for the use of less solvent, and
3) to slow the rate of reaction which permits polymerization at higher temperatures while using the same technology for removing the heat of reaction as had been used in the standard anionic polymerization process.

The processing benefits of using Lewis acids to moderate anionic polymerization techniques have been disclosed in U.S. Pat. No. 6,391,981, U.S. Pat. No. 6,455,651 and U.S. Pat. No. 6,492,469, which are herein incorporated by reference. Related information is disclosed in U.S. Pat. No. 6,444,767 and U.S. Pat. No. 6,686,423, each of which disclosures is incorporated herein by reference. The polymer made by such a moderated, anionic polymerization process can have the same structure as one prepared using the conventional anionic polymerization process and as such, this process can be useful in making the polymers of the present invention. For Lewis acid moderated, anionic polymerization processes, reaction temperatures between 100° C. and 150° C. are preferred as at these temperatures it is possible to take advantage of conducting the reaction at very high polymer concentrations. While a stoichiometric excess of the Lewis acid may be used, in most instances there is not sufficient benefit in improved processing to justify the additional cost of the excess Lewis acid. It is preferred to use from about 0.1 to about 1 mole of Lewis acid per mole of living, anionic chain ends to achieve an improvement in process performance with the moderated, anionic polymerization technique.

Preparation of radial (branched) polymers requires a post-polymerization step called "coupling". In the above radial formulas n is an integer of from 3 to about 30, preferably from about 3 to about 15, and more preferably from 3 to 6, and X is the remnant or residue of a coupling agent. A variety of coupling agents are known in the art and can be used in preparing the coupled block copolymers of the present invention. These include, for example, dihaloalkanes, silicon halides, siloxanes, multifunctional epoxides, silica compounds, esters of monohydric alcohols with carboxylic acids, (e.g. methylbenzoate and dimethyl adipate) and epoxidized oils. Star-shaped polymers are prepared with polyalkenyl coupling agents as disclosed in, for example, U.S. Pat. No. 3,985,830, U.S. Pat. No. 4,391,949 and U.S. Pat. No. 4,444,953; as well as CA 716,645, each of which disclosures is incorporated herein by reference. Suitable polyalkenyl coupling agents include divinylbenzene, and preferably m-divinylbenzene. Preferred are tetra-alkoxysilanes such as tetra-methoxysilane (TMOS) and tetra-ethoxysilane (TEOS), trialkoxysilanes such as methyltrimethoxysilane (MTMS), aliphatic diesters such as dimethyl adipate and diethyl adipate, and diglycidyl aromatic epoxy compounds such as diglycidyl ethers deriving from the reaction of bis-phenol A and epichlorohydrin.

Linear polymers may also be prepared by a post-polymerization "coupling" step. However, unlike radial polymers, "n" in the above formulas is the integer 2, and X is the remnant or residue of a coupling agent.

4. Process to Prepare Hydrogenated Block Copolymers.

As noted, in some cases—i.e., (1) when there is a diene in the B interior blocks, (2) when the A block is a polymer of a 1,3-cyclodiene, (3) when there is an impact modifier block D and (4) when the A block is a polymer of a conjugated diene having a vinyl content of less than 35 mol percent—it is necessary to selectively hydrogenate the block copolymer to remove any ethylenic unsaturation prior to sulfonation. Hydrogenation generally improves thermal stability, ultraviolet light stability, oxidative stability, and, therefore, weatherability of the final polymer, and reduces of the risk of sulfonating the A block or the D block.

Hydrogenation can be carried out via any of the several hydrogenation or selective hydrogenation processes known in the prior art. Such hydrogenation has been accomplished using methods such as those taught in, for example, U.S. Pat. No. 3,595,942, U.S. Pat. No. 3,634,549, U.S. Pat. No. 3,670,054, U.S. Pat. No. 3,700,633, and U.S. Pat. No. Re. 27,145, the disclosures of which are incorporated herein by reference. These methods operate to hydrogenate polymers containing ethylenic unsaturation and are based upon operation of a suitable catalyst. Such catalyst, or catalyst precursor, preferably comprises a Group 8 to 10 metal such as nickel or cobalt which is combined with a suitable reducing agent such as an aluminum alkyl or hydride of a metal selected from Groups 1, 2, and 13 of the Periodic Table of the Elements, particularly lithium, magnesium or aluminum. This preparation can be accomplished in a suitable solvent or diluent at a temperature from about 20° C. to about 80° C. Other catalysts that are useful include titanium based catalyst systems.

Hydrogenation can be carried out under such conditions that at least about 90 percent of the conjugated diene double bonds are reduced, and between zero and 10 percent of the arene double bonds are reduced. Preferred ranges are at least about 95 percent of the conjugated diene double bonds reduced, and more preferably about 98 percent of the conjugated diene double bonds are reduced.

Once the hydrogenation is complete, it is preferable to oxidize and extract the catalyst by stirring the polymer solution with a relatively large amount of aqueous acid (preferably 1 to 30 percent by weight acid), at a volume ratio of about 0.5 parts aqueous acid to 1 part polymer solution. The nature of the acid is not critical. Suitable acids include phosphoric acid, sulfuric acid and organic acids. This stirring is continued at about 50° C. for from about 30 to about 60 minutes while sparging with a mixture of oxygen in nitrogen. Care must be exercised in this step to avoid that an explosive mixture of oxygen and hydrocarbons is formed.

5. Process to Make Sulfonated Polymers

There are several methods of preparing the inverted micellular solution of the sulfonated block copolymer in an aprotic polar solvent. Some methods disclosed herein include first preparing the sulfonated block copolymers in non-halogenated aliphatic solvents, and optionally casting them to a membrane as further described below. Once sulfonated in the aliphatic solvents and then optionally cast to a membrane, such sulfonated polymers can then be dissolved in aprotic polar solvents to form a solution having inverted micelles. This second solution can then be cast to form membranes or films.

According to multiple embodiments disclosed herein, the above prepared block copolymers are sulfonated to obtain a sulfonated polymer product dissolved in a non-halogenated aliphatic solution wherein the sulfonated polymer is arranged into a micellar form.

Without being bound by any particular theory, it is the present belief that the micelle structure of the sulfonated block copolymer in a non-halogenated aliphatic solvent can be illustrated according to described as having a core comprising the sulfonated block or blocks having a substantial amount of spent sulfonating agent residues which is surrounded by the sulfonation resistant block or blocks swollen by the organic non-halogenated aliphatic solvent. As will be further described in more detail below, the sulfonated blocks are highly polar due to the presence of sulfonic acid and/or sulfonate ester functional groups. Accordingly, in such solvents the sulfonated blocks are sequestered into a core of the molecule, while the outer sulfonation resistant polymer block forms a shell which is solubilized by a non-halogenated aliphatic solvent. In addition to forming discrete micelles, there may also be formation of polymer aggregates. Without being bound by any particular theory, polymer aggregates can be described as discrete or non-discrete structures resulting from association of polymer chains in ways other than the description provided for micelles, and/or loosely aggregated groups of two or more discrete micelles. Accordingly, the solvated sulfonated block copolymer in micellar form may include discrete micelles and/or aggregates of micelles, with such solution optionally including aggregated polymer chains having structures other than the micelle structure.

As described herein, micelles can be formed as a result of the sulfonation process, or alternatively, the block copolymer may arrange in a micelle structure prior to sulfonation.

In some embodiments, for the formation of micelles, the sulfonation processes as described in US 2010/0048817 A1 to Dado et al. may be employed. The methods are useful for preparing sulfonated styrenic block copolymers as described in U.S. Pat. No. 7,737,224 to Willis et al.

After polymerization, the polymer can be sulfonated using a sulfonation reagent such as an acyl sulfate in at least one non-halogenated aliphatic solvent. In some embodiments, the precursor polymer can be sulfonated after being isolated, washed, and dried from the reaction mixture resulting from the production of the precursor polymer. In some other embodiments, the precursor polymer can be sulfonated without being isolated from the reaction mixture resulting from the production of the precursor polymer.

a) Solvent

The organic solvent is preferably a non-halogenated aliphatic solvent and contains a first non-halogenated aliphatic solvent which serves to solvate one or more of the sulfonation resistant blocks or non-sulfonated blocks of the copolymer. The first non-halogenated aliphatic solvent may include substituted or unsubstituted cyclic aliphatic hydrocarbons having from about 5 to 10 carbons. Non-limiting examples include cyclohexane, methylcyclohexane, cyclopentane, cycloheptane, cyclooctane and mixtures thereof. The most preferable solvents are cyclohexane, cyclopentane and methylcyclohexane. The first solvent may also be the same solvent used as the polymerization vehicle for anionic polymerization of the polymer blocks.

In some embodiments, the block copolymer may be in micellar form prior to sulfonation even in the case of using only a first solvent. The addition of a second non-halogenated aliphatic solvent to a solution of the precursor polymer in the first non-halogenated aliphatic solvent can result in or assist the "pre-formation" of polymer micelles and/or other polymer aggregates. The second non-halogenated solvent, on the other hand, is preferably chosen such that it is miscible with the first solvent, but is a poor solvent for the sulfonation susceptible block of the precursor polymer in the process temperature range and also does not impede the sulfonation reaction. In other words, preferably, the sulfonation susceptible block of the precursor polymer is substantially insoluble in the second non-halogenated solvent in the process temperature range. In the case where the sulfonation susceptible block of the precursor polymer is polystyrene, suitable solvents which are poor solvents for polystyrene and can be used as the second non-halogenated solvent include linear and branched aliphatic hydrocarbons of up to about 12 carbons, for example, hexane, heptane, octane, 2-ethyl hexane, isooctane, nonane, decane, paraffinic oils, mixed paraffinic solvents, and the like. One preferred example of the second non-halogenated aliphatic solvent is n-heptane.

The pre-formed polymer micelles and/or other polymer aggregates can allow that the sulfonation of the polymer proceeds essentially without disabling gelling at considerably higher concentration than can be achieved without the addition of the second solvent. In addition, this approach can substantially improve the utility of more polar acyl sulfates, such as $C_3$ acyl sulfate (propionyl sulfate), in terms of polymer sulfonation conversion rate and minimization of by-products. In other words, this approach may improve the utility of more polar sulfonation reagents. Such acyl sulfates are further described below.

b) Polymer Concentration

In accordance with some embodiments, high levels of styrene sulfonation can be achieved in a manner that is substantially free of polymer precipitation and free of disabling gelling in the reaction mixture, the reaction product, or both, by maintaining the precursor polymer concentration below a limiting concentration of the precursor polymer, at least during the early stages of sulfonation. It will be understood by those skilled in the art that minor amounts of polymers may deposit on surfaces as a result of localized solvent evaporation in the course of processing in a mixture that is substantially free of polymer precipitation. For example, in accordance with some embodiments, a mixture is considered to be substantially free of polymer precipitation when no more than 5% of the polymer in the mixture has precipitated.

The polymer concentration at which the sulfonation can be conducted is dependent upon the composition of the starting polymer, since the limiting concentration below which polymer gelling is non-disabling or negligible depends upon the polymer composition. As stated above, the limiting concentration may also depend on other factors such as the identity of the solvent or the solvent mixture used and the degree of sulfonation desired. Generally, the polymer concentration falls within the range of from about 1%-wt. to about 30%-wt. alternatively from about 1%-wt. to about 20%-wt., alternatively from about 1%-wt. to about 15%-wt., alternatively from about 1%-wt. to about 12%-wt., or alternatively from about 1%-wt. to about 10%-wt., based on the total weight of a reaction mixture that is preferably substantially free of halogenated solvents. It will be understood by those skilled in the art that suitable ranges include any combination of the specified weight percents even if the specific combination and range is not listed herewith.

In accordance with some embodiments of the presently described technology, the initial concentration of the precursor polymer or mixture of precursor polymers should be maintained below the limiting concentration of the precursor polymer(s), alternatively in the range of from about 0.1%-wt. to a concentration that is below the limiting concentration of the precursor polymer(s), alternatively from about 0.5%-wt. to a concentration that is below the limiting concentration of the precursor polymer(s), alternatively from about 1.0%-wt. to a concentration that is about 0.1%-wt. below the limiting concentration of the precursor polymer(s), alternatively from about 2.0%-wt. to a concentration that is about 0.1%-wt. below the limiting concentration of the precursor polymer(s), alternatively from about 3.0%-wt. to a concentration that is about 0.1%-wt. below the limiting concentration of the precursor polymer(s), alternatively from about 5.0%-wt. to a concentration that is about 0.1%-wt. below the limiting concentration of the precursor polymer(s), based on the total weight of the reaction mixture. It will be understood by those skilled in the art that suitable ranges include any combination of the specified weight percents even if the specific combination and range is not listed herewith.

At least in some embodiments, maintaining the polymer concentration below the limiting concentration can result in reaction mixtures with reduced concentrations of by-product carboxylic acid relative to the higher concentration conditions that lead to gelling.

It will be understood by those skilled in the art, however, that during the production of the sulfonated polymer in some embodiments of the present technology, especially in a semi-batch or continuous production process, the total concentration of the polymers in the reaction mixture may be above the limiting concentration of the precursor polymer.

c) Sulfonation agent

According to multiple embodiments, acyl sulfate may be used for sulfonating the polymerized block copolymer. The acyl group preferably is derived from a $C_2$ to $C_8$, alternatively $C_3$ to $C_8$, alternatively $C_3$ to $C_5$, linear, branched, or cyclic carboxylic acid, anhydride, or acid chloride, or mixtures thereof. Preferably, these compounds do not contain non-aromatic carbon-carbon double bonds, hydroxyl groups, or any other functionality that is reactive with acyl sulfate or decomposes readily under sulfonation reaction conditions. For example, acyl groups that have aliphatic quaternary carbons in the alpha-position from the carbonyl functionality (e.g., acyl sulfate derived from trimethylacetic anhydride)

appear to decompose readily during polymer sulfonation reaction, and preferably should be avoided in the presently described technology. Also included in the scope of useful acyl groups for the generation of acyl sulfate in the present technology are those derived from aromatic carboxylic acids, anhydrides, and acid chlorides such as benzoic and phthalic anhydride. More preferably, the acyl group is selected from the group of acetyl, propionyl, n-butyryl, and isobutyryl. Even more preferably, the acyl group is isobutyryl. It has been discovered that isobutyryl sulfate can afford high degrees of polymer sulfonation and relatively minimal by-product formation.

The formation of acyl sulfate from a carboxylic anhydride and sulfuric acid can be represented by the following reaction:

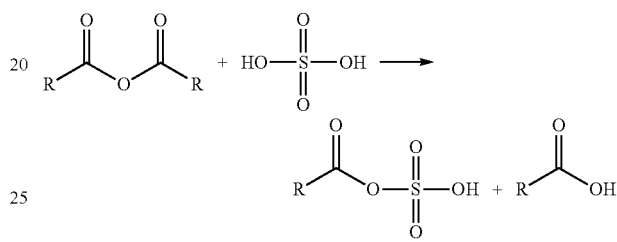

Acyl sulfates are subject to slow decomposition during the course of sulfonation reactions forming alpha-sulfonated carboxylic acids of the following formula:

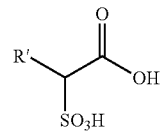

In one embodiment of the presently described technology, the acyl sulfate reagent is obtained from a carboxylic anhydride and sulfuric acid in a reaction that is conducted in a separate "pre-generation" reaction prior to addition to a solution of polymer in a non-halogenated aliphatic solvent. The pre-generation reaction can be conducted with or without a solvent. When a solvent is used to pre-generate the acyl sulfate, the solvent is preferably non-halogenated. Alternatively, the acyl sulfate reagent can be obtained in an in-situ reaction within a solution of the polymer in a non-halogenated aliphatic solvent. In accordance with this embodiment of the present technology, the molar ratio of anhydride to sulfuric acid can be from about 0.8 to about 2, and preferably from about 1.0 to about 1.4. The sulfuric acid used in this preferred method preferably has a concentration of about 93% to about 100% and more preferably has a concentration of about 95% to about 100%, by weight. Those skilled in the art will recognize that oleum may be used as an alternative to sulfuric acid in an in-situ reaction to generate acyl sulfate, provided that the oleum strength is sufficiently low so as to avoid or minimize unintended charring of the reaction mixture.

In another embodiment of the present technology, the acyl sulfate reagent can be obtained from a carboxylic anhydride and oleum in a reaction that is conducted in a separate "pre-generation" reaction prior to addition to a solution of polymer in aliphatic solvent, wherein the oleum strength is in the range of from about 1% to about 60% free sulfur trioxide, alternatively from about 1% to about 46% free sulfur trioxide, alternatively from about 10% to about 46% free sulfur trioxide, and wherein the molar ratio of anhydride to sulfuric acid present in the oleum is from about 0.9 to about 1.2.

Additionally, the acyl sulfate reagent can also be prepared from a carboxylic anhydride via reaction with any combination of sulfuric acid, oleum, or sulfur trioxide. Further, the acyl sulfate reagent can be prepared from a carboxylic acid via reaction with chlorosulfonic acid, oleum, sulfur trioxide, or any combination thereof. Moreover, the acyl sulfate reagent can also be prepared from a carboxylic acid chloride via reaction with sulfuric acid. Alternatively, the acyl sulfate may be prepared from any combination of carboxylic acid, anhydride, and/or acid chloride.

The sulfonation of polymer styrenic repeat units with the acyl sulfate can be represented by the following reaction:

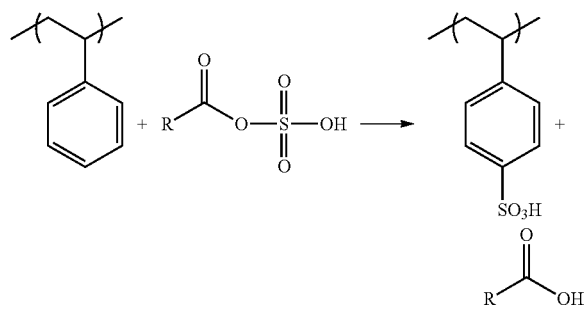

The acyl sulfate reagent may be used relative to the moles of sulfonation susceptible monomer repeat units present in the polymer solution in amounts ranging from very low levels for lightly sulfonated polymer products to high levels for heavily sulfonated polymer products. The molar amount of the acyl sulfate can be defined as the theoretical amount of the acyl sulfate that can be generated from a given method, the amount being dictated by the limiting reagent in the reaction. The molar ratio of acyl sulfate to styrene repeat units (i.e., sulfonation susceptible units) in accordance with some embodiments of the present technology may range from about 0.1 to about 2.0, alternatively from about 0.2 to about 1.3, alternatively from about 0.3 to about 1.0.

In accordance with at least some embodiments of the presently described technology, the degree of sulfonation (Ionic Exchange Capacity) of the vinyl aromatic monomers susceptible to sulfonation in the block polymers is about 0.4 milliequivalents (meq) sulfonic acid per gram sulfonated polymer (0.4 meq/g) or less, alternatively equal to or less than about 0.6 meq sulfonic acid per gram sulfonated polymer (0.6 meq/g), alternatively equal to or less than about 0.7 meq sulfonic acid per gram sulfonated polymer (0.8 meq/g), alternatively equal to or less than about 1.0 meq sulfonic acid per gram sulfonated polymer (1.0 meq/g), alternatively equal to or less than about 1.2 meq sulfonic acid per gram sulfonated polymer (1.2 meq/g), alternatively equal to or less than about 1.3 meq sulfonic acid per gram sulfonated polymer (1.3 meq/g), alternatively equal to or less than about 1.6 meq sulfonic acid per gram sulfonated polymer (1.6 meq/g), alternatively equal to or less than about 1.8 meq sulfonic acid per gram sulfonated polymer (1.8 meq/g) or less, alternatively equal to or less than about 2.0 meq sulfonic acid per gram sulfonated polymer (2.0 meq/g), alternatively equal to or less than about 2.2 meq sulfonic acid per gram sulfonated polymer (2.2 meq/g), alternatively equal to or less than about 2.5 meq sulfonic acid per gram sulfonated polymer (2.2 meq/g). The most preferred range being 1.0 meq sulfonic acid per gram sulfonated polymer (1.0 meq/g) or less. Another means of describing the sulfonation levels of the polymer refer to mol percent sulfonation. The typical levels of sulfonation are where each B block contains one or more sulfonic functional groups. Preferred levels of sulfonation are from about 10 to about 100 mol percent, alternatively from about 20 to 95 mol percent, alternatively from about 30 to 90 mol percent, and alternatively from about 40 to about 70 mol percent, based on the mol percent of sulfonation susceptible vinyl aromatic monomers in each B block, which can be, for example, unsubstituted styrene monomer, ortho-substituted styrene monomer, meta-substituted styrene monomer, alpha-methylstyrene monomer, 1,1-diphenyl ethylene monomer, 1,2-diphenyl ethylene monomer, a derivative thereof, or a mixture thereof. It will be understood by those skilled in the art that suitable ranges of sulfonation level include any combination of the specified mol percents even if the specific combination and range is not listed herewith.

The level or degree of sulfonation of a sulfonated polymer can be measured by an NMR and/or titration methods as known to people skilled in the art, and/or a method using two separate titrations as described in the Examples below and may be appreciated by people skilled in the art. For example, a resulting solution from the methods of the present technology can be analyzed by $^1$H-NMR at about 60° C. (±20° C.). The percentage styrene sulfonation can be calculated from the integration of aromatic signals in the $^1$H-NMR spectrum. For another example, the reaction product can be analyzed by two separate titrations (the "two-titration method") to determine the levels of styrenic polymer sulfonic acid, sulfuric acid, and non-polymeric by-product sulfonic acid (e.g. 2-sulfo-alkylcarboxylic acid), and then to calculate the degree of styrene sulfonation based on mass balance. Alternatively, the level of sulfonation can be determined by titration of a dry polymer sample, which has been redissolved in tetrahydrofuran with a standardized solution of NaOH in a mixture of alcohol and water. In the latter case, rigorous removal of by-product acids is preferably ensured.

Although embodiments for sulfonating polymers are described above in the context of acyl sulfate reagents, the utility of other sulfonation reagents are also contemplated. For example, the use of those sulfonation reagents derived from the complexation/reaction of sulfur trioxides with phosphate esters such as triethylphosphate has been demonstrated in the present technology. The chemistry of such sulfonation reagents is known in the art to afford aromatic sulfonation with significant degrees of sulfonic acid alkyl ester incorporation. As such, the resultant sulfonated polymers likely contain both sulfonic acid and sulfonic acid alkyl ester groups. Other contemplated sulfonation reagents include, but are not limited to, those derived from the reaction or complexation of sulfur trioxide with phosphous pentoxide, polyphophoric acid, 1,4-dioxane, triethylamine, etc.

d) Reaction Conditions

The sulfonation reaction between the acyl sulfates and sulfonation susceptible block copolymers such as aromatic-containing polymers (e.g., styrenic block copolymers) can be conducted at a reaction temperature in the range of from about 20° C. to about 150° C., alternatively from about 20° C. to about 100° C., alternatively from about 20° C. to about 80° C., alternatively from about 30° C. to about 70° C., alternatively from about 40° C. to about 60° C. (e.g., at about 50° C.). The reaction time can be in the range of from approximately less than 1 minute to approximately 24 hours or longer, dependent on the temperature of the reaction. In some preferred acyl sulfate embodiments that utilize in-situ reaction of carboxylic anhydride and sulfuric acid, the initial temperature of the reaction mixture can be about the same as the intended sulfonation reaction temperature. Alternatively, the initial temperature may be lower than the intended subsequent sulfonation reaction temperature. In a preferred embodiment, the acyl sulfate can be generated in-situ at about 20° C. to about 40° C. (e.g., at about 30° C.) for about 0.5 to about 2 hours, alternatively about 1 to about 1.5 hours, and then the reaction mixture can be heated to about 40° C. to about 60° C. to expedite the completion of the reaction.

Although not required, an optional reaction quenching step can be conducted through the addition of a quenching agent, which can be, for example, water or hydroxyl-containing compounds such as methanol, ethanol, or isopropanol. Typically in such a step, an amount of the quenching agent at least sufficient to react with residual unreacted acyl sulfate may be added.

In some embodiments of the presently described technology, the sulfonation of the aromatic-containing polymer in a non-halogenated aliphatic solvent can be carried out by contacting the aromatic-containing polymer with a sulfonation reagent in a batch reaction or a semi-batch reaction. In some other embodiments of the present technology, the sulfonation can be carried out in a continuous reaction, which can be enabled, for example, through the use of a continuous stirred tank reactor or a series of two or more continuous stirred tank reactors.

As a result of sulfonation, the micelle cores contain sulfonation susceptible blocks having sulfonic acid and/or sulfonate ester functionality which are surrounded by an outer shell containing sulfonation resistant blocks of the block copolymer. The driving force for this phase segregation (causing the micelle formation) in solution has been attributed to the considerable difference in polarity between the sulfonated block(s) and the non-sulfonated blocks of the sulfonated block copolymer. The latter blocks are freely soluable by a non-halogenated aliphatic solvent, for example the first solvent disclosed above. On the other hand, the sulfonated polymer block(s) may arrange to concentrate in the core of micelle; this composition is herein termed a conventional micelle structure. This structure is to be differentiated from an inverted micelle structure which is discussed below.

Once the sulfonation reaction is completed, the block copolymers can be cast directly into an article form (e.g., membrane) without the necessity of isolating the block copolymer. In this particular embodiment, the polymeric film (e.g., membrane) can be submerged in water and will retain its form (solid) while in the water. In other words, the block copolymer will not dissolve in water or disperse in water.

6. Dissolution of Sulfonated Block Copolymers

The sulfonated block copolymers formed according to the above processes can further be dissolved in aprotic polar solvents in order to obtain an improved polymer composition. When dissolved in an aprotic polar solvent, the sulfonated block copolymers arrange themselves into an inverted micelle structure. The methods for dissolving the sulfonated block copolymer depends on whether the sulfonated block copolymer is in (1) a solid form (as in a film, membrane, or crumb, for example), or (2) in solution (i.e. one or more non-halogenated aliphatic solutions), also known as cement.

(a) Dissolving a Sulfonated Block Copolymer Film or Membrane

With respect to sulfonated block copolymers cast from non-halogenated aliphatic solutions as described above, these can be dissolved according to the method disclosed herein. In particular, the process can be as follows:

1) Drying an aprotic polar solvent;
2) Applying sulfonated block copolymer to the solvent;
3) Heating the mixture;
4) Optionally casting to form a film.

The solvents used for dissolving the sulfonated block copolymer membrane include aprotic polar solvents. Preferably, such solvents preferentially solubilize the polar sulfonated segments of the sulfonated block copolymers. In some embodiments, it is preferred that the aprotic polar solvent have an affinity for solubilizing both the polar sulfonated segments of the sulfonated block copolymers as well as the non-polar non-sulfonated segments (e.g. t-butyl styrene) at elevated temperatures. However, such aprotic polar solvents preferentially solubilize the sulfonated polar segments when at a lower temperature (i.e. room temperature). Therefore, at elevated temperatures the sulfonated block copolymers will dissolve into solution, however, when reduced to a lower temperature the polar segments will be preferentially solubalized therefore facilitating the sulfonated block copolymer arranging itself into the inverted micelle structure.

The solvent can include one or more aprotic polar solvents including amides, esters, ketones, nitriles, tertiary amines, sulfates and sulfoxides. In some embodiments, the ketones and esters can be cyclic or non-cyclic having from 1 to 20 carbon atoms. The esters can include esters of carboxylic acids, esters of sulfuric acid, amides, carboxylic acids, anhydrides, sulfoxides, nitriles, and ketones having from 1 to 20 carbon atoms, preferably from 1 to 8 carbon atoms, more preferably from 1 to 4 carbon atoms. In particular, aprotic polar solvents can include for example, dimethyl acetamide (DMA), N,N-dimethyl formamide (DMF), acetonitrile, dimethyl ketone, diethyl ketone, methyl ethyl ketone, N-methylpyrrolidone (NMP), dimethylsulfoxide (DMSO), dimethyl ketone, diethyl ketone, methyl ethyl ketone, cyclohexanone, methylsulfate, and dimethylsulfate.

More preferred are aprotic polar compounds containing at least one nitrogen atom, for example such as amides. The amides can be cyclic or non-cyclic amides and optionally substituted with branched or unbranched, cyclic or non-cyclic, or aromatic substituents having 1-12 carbon atoms. Accordingly, the most preferred aprotic polar solvents are DMA, DMF and NMP.

The aprotic polar solvents can also be admixed with aprotic non-polar solvents as well. However, the solution should be such that the aprotic polar solvent solubilizes the polar sulfonated styrene segments of the block copolymer, while on the other hand the non-sulfonated non-polar segments are not fully solubilized, thus allowing the inverted micelle structure to form. Accordingly, the aprotic polar solvents as compared to aprotic non-polar solvents should be in a ratio of from 19:1 to 1:1, alternatively from 9:1 to 2:1, alternatively from 5:1 to 3:1.

Furthermore, preferably the solvents used have sufficient polarity for solubilizing the functionalized polar segments of the sulfonated block copolymers. In particular, dipole moments of about 1.2 and above are preferred, alternatively about 1.5 and above, preferably about 1.9 and above, more preferably about 2.0 and above, more preferably about 2.3 and above, more preferably about 2.5 and above, more preferably about 2.7 and above, more preferably about 3.0 and above, more preferably about 3.2 and above, more preferably 3.4 and above, more preferably about 3.7 and above, more preferably about 3.8 and above.

The aprotic polar solvent should be dried prior to use, preferably with a molecular sieve. Molecular sieves are known in the art and can be employed to remove water from the solvent. These can include alumina, aluminosilicate minerals, clays, porous glass, microporous charcoal, activated carbon, desiccant, lime, silica gel, and/or zeolites.

After drying the aprotic polar solvent, the sulfonated block copolymer can be placed therein for dissolution. In embodiments disclosed herein heat is supplied to the mixture, for example by use of an oven. The maximum temperature range is limited by the boiling point of the aprotic polar solvent used. Generally, the temperature must be at least 40° C., alternatively at least 50° C., alternatively at least 60° C., alternatively at least 70° C., alternatively at least 80° C. to the extent the employed solvent allows. Accordingly, the maximum heat can be up to 200° C., or alternatively up to 175° C., or alternatively up to 150° C., or alternatively up to 125° C., or alternatively up to 100° C. The acceptable ranges for heating include combinations of the aforementioned ranges. The heating can be done overnight, or over a 24 hour period. Less time can be employed, however, it should be sufficient to allow dissolution of the solid sulfonated block copolymer membrane, film, crumb or article.

(b) Dissolving a Sulfonated Block Copolymer Via Rotovac

The sulfonated block copolymers can be prepared additionally directly from the non-halogenated solutions described above without recovery as a solid. After preparation of the sulfonated block copolymer in solvent, instead of recovering the sulfonated block copolymer as a solid via casting the sulfonated block copolymer to a film or membrane or other process, the aprotic polar solution can be added and the non-halogenated aliphatic solvents can be evaporated off.

One method for carrying this out is by use of a rotovap. Accordingly, the sulfonated block copolymer which had been prepared in the non-halogenated aliphatic solvent (referred to herein as the initial solution) is combined with an aprotic polar solvent (e.g. DMA) in a vessel. These can be combined at a ratio of the initial solution to aprotic polar solvent from about 10:1 to 1:10, alternatively from about 3:1 to 1:3, alternatively from about 2:1 to 1:2, and most preferably at approximately a about 1:1 ratio. The vessel can then be connected to a rotovap (rotary evaporator) for removal of the initial solvent. The temperature should be such that it is above the boiling point of the initial solvent, but below the boiling point of the aprotic polar solvent. Accordingly, the initial solvent would evaporate thereby leaving the sulfonated copolymer in the aprotic polar solvent. In some embodiments, the rotovap may be employed such that the initial solvent is not totally removed, but instead a mud-like slurry results. In such embodiments, the initial solvent can be further removed by placing the product in an oven at a higher temperature than the rotovap process took place. The product will likely then become more clear and viscous, and drying can be continued until the desired concentration is reached.

(c) Casting the Membranes

Once dissolved in the aprotic polar solvents described above, the sulfonated block copolymers will have arranged themselves into the inverted micelle structure. The concentration of the sulfonated block copolymer in aprotic polar solvent is desirable to be about 15% or less, or alternatively about 13% or less, alternatively about 12% or less, alternatively about 10% or less, alternatively about 8% or less, alternatively about 7% or less, alternatively about 5% or less, alternatively about 3% or less, alternatively about 2% or less.

These solutions can then be cast according to known processes to a film or membrane. Films of the compositions prepared as described above can be cast against silicanized glass plates at room temperature in a box with a nitrogen purge. Films will then be allowed to dry in this manner until the solvent evaporated. The time for drying depends on the particular solvents used and size and thickness of the membrane, however, generally they may be for a period of at least 16 hours.

As described herein, the sulfonated block copolymers membranes cast from the aprotic polar solutions have high moisture-vapor transport rates (MVTR) along with low water uptake, and good mechanical properties such as good tensile strength in the presence of water.

The moisture-vapor transport rate of the films in accordance with the present disclosure may be quantified in terms of grams of water which are transported through the layer or film and an exposed surface area of 1 $m^2$ per day ($g/m^2/day$). The moisture-vapor transmission rate may be determined in accordance with ASTM E 96/E96M in an upright cup or inverted cup manner. In the upright cup measurement method, one surface of the layer or film is in contact with moisture-vapor whereas air having a temperature of 25° C. and a relative humidity of 50% is blown across the opposite surface. In the inverted cup measurement method, one surface of the layer or film is in contact with water whereas air having a temperature of 25° C. and a relative humidity of 50% is blown across the opposite surface. Deviations from ASTM E96 include a larger than recommended air gap in an upright cup configuration and an air flow rate that is not consistent with the standard. Accordingly, this method for determining moisture-vapor transport rate can be referred to as "the modified ASTM E96/E96M method" or "the inverted cup method." All reported measurements are made under consistent conditions.

The inverted cup moisture-vapor transmission rate of coatings obtained using a coating dispersion in accordance with the preferred embodiment of the present disclosure is generally at least about 25 liter/m2/day, or at least about 22 liter/m2/day, or at least about 20 liter/m2/day, or at least about 15 liter/m2/day, or at least about 10 liter/m2/day. In general, the water uptake is between 10 and 90%-wt., based on the weight of the dry polymer. In some embodiments, the water uptake may be less than 40%-wt. based on the weight of the dry polymer, or less than 30%-wt., or less than 20%-wt., or less than 15%-wt., or less than 10%-wt., or less than 9%-wt., or less than 8%-wt.or between 0.5 and 5%-wt. under equilibrium swelling conditions.

The coated layers and film layers in accordance with the present disclosure have a good balance of toughness, extensibility and low modulus in the dry state which is desirable for components used in breathable fabrics and other applications described herein. The tensile strengths of these materials are typically at least 200 psi and more usually above 1,000 psi, and further above 1,500 psi. Their elongation at break is typically at least 40% to 100%. Additionally, the Young's modulus values typically in the range of from about 1,000 to about 60,000 psi.

The area resistance of a membrane can be determined by direct current (DC) measurements or by alternating current (AC) measurements. Resistance measured by DC is typically higher than resistance measured by AC, because resistance measured by DC includes boundary layer effect. Since the boundary layer effect always exists in the real application, resistance data from a DC method more closely represent the performance of the material in a practical application. For measuring membrane resistance, the potential drop between Haber-Luggin capillaries (in the art also referred to as Luggin or Luggin-Haber capillaries) is measured with and without the membrane as a function of the current density in an apparatus schematically shown in FIG. 1. The resistance is given by the slope of the current vs. the voltage drop. To obtain the membrane resistance, the resistance without the membrane is subtracted from the resistance with the membrane. FIG. 2 illustrates how to obtain membrane resistance. Membrane resistance is the difference in slope.

In some embodiments, the membranes of the modified block copolymers having a thickness of about 20-45 μm exhibit an area resistance of no more than 5 Ωcm². In further embodiments, the area resistance of the respective membranes is no more than 2.5 Ωcm². In particular embodiments, the area resistance of the respective membranes is 1.0 Ωcm² or less. In very particular embodiments, the area resistance of the respective membranes is at most 0.85 Ωcm² or is at most 0.75 Ωcm².

Moreover with respect to electrically driven processes or applications requiring ion flow, the membranes disclosed herein have high ion flux and high conductivity and selectivity. For example, the specific conductivity may be at least 0.4 to about 11 mS/cm, or alternatively from 0.8 to 8 mS/cm, or alternatively from 1.5 to 5 mS/cm, or alternatively from 2 to 4 mS/cm, or alternatively from 2.5 to 3. Additionally, the specific conductivity may be at least 0.5 mS/cm, or alternatively at least 1.0 mS/cm, or alternatively at least 1.5 mS/cm, or alternatively at least 2.0 mS/cm, or alternatively at least 2.0 mS/cm, or alternatively at least 2.5 mS/cm. Combinations of the above ranges may be employed.

Figure 3:
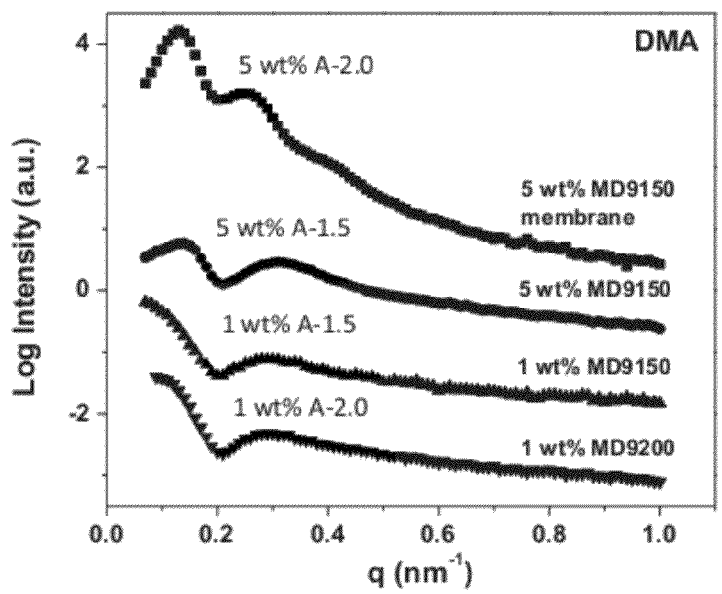
FIG. 3 illustrates X-ray scattering results for sulfonated block copolymers A-2.0 and A-1.5 in DMA at 1% wt and 5% wt solutions.

In some embodiments, it has surprisingly been found that the membranes of the modified block copolymers are permselective. The permselectivity of the membranes can be determined as an "apparent" permselectivity based on the measurement of the potential gradient across a membrane which separates two electrolyte solutions having different electrolyte concentrations. Those of ordinary skill will appreciate that the apparent permselectivity is always larger than the permselectivity under practice conditions because the measurement fails to account for boundary layer effects. However, the difference between the measured permselectivity value and the permselectivity under practice conditions is generally small. FIG. 3 schematically illustrates the experiment set-up for measuring the permselectivity. In the illustrative set-up of FIG. 3, the electrolyte solution on one side of the membrane has a concentration of 0.5M KCl, and the electrolyte concentration is the solution on the other side of the membrane is 1M KCl. For a membrane with transport number of 1, the potential difference across the membrane should be 0.0158 volt. On this basis, the permselectivity of the actual membrane can be calculated according to following equation:

Permselectivity (%)=potential drop across membrane/ 0.0158

Of course, other solutions and concentrations can be used too. But corrections need to be made for different concentrations as well as for difference in ion mobility in solutions.

Additionally the selectivity may be at least 50 to 100%, or alternatively at least 80 to 100%, or alternatively at least from 90 to 100%, or alternatively at least 95 to 100%, or alternatively at least 97 to 100%, or alternatively at least 98 to 100%, or alternatively at least 99% to 100%.

7. Additional Components

Further, the copolymer compositions disclosed herein can be compounded with other components not adversely affecting the copolymer properties or the membrane formed from the sulfonated block copolymer. Further, the disclosed block copolymers may be blended with a large variety of other polymers, including olefin polymers, styrene polymers, tackifying resins, hydrophilic polymers and engineering thermoplastic resins, with polymer liquids such ionic liquids, natural oils, fragrances, and with fillers such as nanoclays, carbon nanotubes, fullerenes, and traditional fillers such as talcs, silica and the like.

In addition, the sulfonated polymers of the present invention may be blended with conventional styrene/diene and hydrogenated styrene/diene block copolymers, such as the styrene block copolymers available from Kraton Polymers LLC. These styrene block copolymers include linear hydrogenated and non-hydrogenated S-B-S, S-I-S, S-EB-S, S-EP-S block copolymers. Also included are radial block copolymers based on styrene along with isoprene and/or butadiene and selectively hydrogenated radial block copolymers.

Additionally, the styrene block copolymers S-B-S, S-I-S, S-EB-S, S-EP-S may be functionalized, for example with a monocarboxylic or polycarboxylic acid compound, such as maleic acid or a derivative such as maleic anhydride. The preferred acid compounds are unsaturated monocarboxylic and polycarboxylic-containing acids ($C_3$-$C_{10}$) with preferably at least one olefinic unsaturation, and anhydrides, salts, esters, ethers and other substituted derivatives from such acids. Examples of such materials include maleic acid, fumaric acid, itaconic acid, citraconic acid, acrylic acid, acrylic polyethers, acrylic anhydride, methacrylic acid, crotonic acid, isocrotonic acid, mesaconic acid, angelic acid, maleic anhydride, itaconic anhydride and citraconic anhydride. The preferred monomers for functionalizing styrenic block copolymers are maleic anhydride, maleic acid, fumaric acid and their derivatives. These functionalized styrenic block copolymers (F-SBCs) may be blended with the sulfonated block copolymer (S-SBC) in a ratio (F-SBC/S-SBC) of 20/80 to 80/20, more preferably from 30/70 to 70/30 or most preferably 60/40 to 40/60. Additionally, other acid functionalities may be used as well as known as the art.

Olefin polymers include, for example, ethylene homopolymers, ethylene/alpha-olefin copolymers, propylene homopolymers, propylene/alpha-olefin copolymers, high impact polypropylene, butylene homopolymers, butylene/alpha olefin copolymers, and other alpha olefin copolymers or interpolymers. Representative polyolefins include, for example, but are not limited to, substantially linear ethylene polymers, homogeneously branched linear ethylene polymers, heterogeneously branched linear ethylene polymers, including linear low density polyethylene (LLDPE), ultra or very low density polyethylene (ULDPE or VLDPE), medium density polyethylene (MDPE), high density polyethylene (HDPE) and high pressure low density polyethylene (LDPE). Other polymers included hereunder are ethylene/acrylic acid (EEA) copolymers, ethylene/methacrylic acid (EMAA) ionomers, ethylene/vinyl acetate (EVA) copolymers, ethylene/vinyl alcohol (EVOH) copolymers, ethylene/cyclic olefin copolymers, polypropylene homopolymers and copolymers, propylene/styrene copolymers, ethylene/propylene copolymers, polybutylene, ethylene carbon monoxide interpolymers (for example, ethylene/carbon monoxide (ECO) copolymer, ethylene/acrylic acid/carbon monoxide terpolymer and the like). Still other polymers included hereunder are polyvinyl chloride (PVC) and blends of PVC with other materials.

Styrene polymers include, for example, crystal polystyrene, high impact polystyrene, medium impact polystyrene, styrene/acrylonitrile copolymers, styrene/acrylonitrile/butadiene (ABS) polymers, syndiotactic polystyrene, sulfonated polystyrene and styrene/olefin copolymers. Representative styrene/olefin copolymers are substantially random ethylene/styrene copolymers, preferably containing at least 20, more preferably equal to or greater than 25 weight percent copolymerized styrene monomer.

Exemplary materials that could be used as additional components would include, without limitation:
1) pigments, antioxidants, stabilizers, surfactants, and flow promoters;

2) particulates, fillers and oils; and 3) solvents and other materials added to enhance proccessability and handling of the composition.

With regard to the pigments, antioxidants, stabilizers, surfactants, and flow promoters, these components, when utilized in compositions with the sulfonated block copolymers of the present invention may be included in amounts up to and including 10%, i.e., from 0 to 10%, based on the total weight of the composition. When any one or more of these components are present, they may be present in an amount from about 0.001 to about 5%, and even more preferably from about 0.001 to about 1%.

With regard to particulates, fillers and oils, such components may be present in an amount up to and including 50%, from 0 to 50%, based on the total weight of the composition. When any one or more of these components are present, they may be present in an amount from about 5 to about 50%, preferably from about 7 to about 50%.

8. Applications

The aprotic polar cast sulfonated block copolymer compositions described herein can be employed in a variety of applications and end uses, and their property profile renders them particularly suited as materials in applications which require good dimensional stability along with good tensile strength and mechanical properties in wet environments while providing high water transport.

Accordingly, in some embodiments, the sulfonated block copolymers cast from aprotic polar solutions described herein are particularly employed as materials for water vapor transporting membranes which are employed in wet or aqueous environments. Such membranes are, for example useful in devices for controlling humidity, devices for forward electrodialysis, devices for reverse electrodialysis, devices for pressure retarded osmosis, devices for forward osmosis, devices for reverse osmosis, devices for selectively adding water as in irrigation applications, devices for selectively removing water as in drying applications, various medical applications where transportation of water across the membrane is useful and batteries.

In one embodiment of the present invention, the sulfonated block copolymers cast from aprotic polar solutions may be used in electrochemical applications wherein ion transport performance is valued, such as in fuel cells (separator phase), proton exchange membranes for fuel cells, dispersions of metal impregnated carbon particles in sulfonated polymer cement for use in electrode assemblies, including those for fuel cells, water electrolyzers (electrolyte), acid batteries (electrolyte separator), super capacitors (electrolyte), separation cell (electrolyte barrier) for metal recovery processes, sensors (particularly for sensing humidity) and the like. The amine sulfonated block copolymers are also used as desalination membranes, and in coatings on porous membranes. Their selectivity in transporting gases makes them useful for gas separation applications. Additionally, the sulfonated block copolymers are used in protective clothing and breathable fabric applications where the membranes, coated fabrics, and fabric laminates could provide a barrier of protection from various environmental elements (wind, rain, snow, chemical agents, biological agents) while offering a level of comfort as a result of their ability to rapidly transfer water from one side of the membrane or fabric to the other, e.g., allowing moisture from perspiration to escape from the surface of the skin of the wearer to the outside of the membrane or fabric and vice versa. Full enclosure suits made from such membranes and fabrics may protect first responders at the scene of an emergency where exposure to smoke, a chemical spill, or various chemical or biological agents are a possibility. Similar needs arise in medical applications, particularly surgery, where exposure to biological hazards is a risk. Surgical gloves and drapes fabricated from these types of membranes are other applications that could be useful in a medical environment. Articles fabricated from these types of membranes could have antibacterial and/or antiviral and/or antimicrobial properties as reported in U.S. Pat. No. 6,537,538, U.S. Pat. No. 6,239,182, U.S. Pat. No. 6,028,115, U.S. Pat. No. 6,932,619 and U.S. Pat. No. 5,925,621 where it is noted that polystyrene sulfonates act as inhibitory agents against HIV (human immunodeficiency virus) and HSV (herpes simplex virus). In personal hygiene applications, a membrane or fabric of the present invention that would transport water vapor from perspiration while providing a barrier to the escape of other bodily fluids and still retain its strength properties in the wet environment would be advantageous. The use of these types of materials in diapers and adult incontinence constructions would be improvements over existing technologies.

Accordingly, in some embodiments, the sulfonated block copolymers cast from aprotic polar solutions described herein are particularly employed as materials for water vapor transporting membranes which are employed in wet or aqueous environments. Such membranes are, for example useful in devices for controlling humidity, devices for forward electrodialysis, devices for reverse electrodialysis, devices for pressure retarded osmosis, devices for forward osmosis, devices for reverse osmosis, devices for selectively adding water, devices for selectively removing water, and batteries.

(a) Electrodialysis

Electrodialytic cells are well known in the art. A general example of such an electrodialytic cell is described in U.S. Pat. No. 5,868,916, and FIG. 1 of U.S. Pat. No. 7,790,016, as well as FIG. 1 of U.S. Pat. No. 6,017,433 which are hereby incorporated by reference. However, the membranes cast from aprotic polar solutions as disclosed herein have low resistance to ion transport and are therefore especially useful for electrodialytic applications including electrodialytic desalination. In some embodiments for electrodialytic applications, a cell is employed having an anode and cathode. Between the anode and cathode are exchange membranes which selectively permit anions and cations to pass therethrough. The membranes form compartments between one another, with multi-unit cells having many of such compartments between the anode and cathode (also referred to as a stack). Water, or a feed stream to be treated, can be fed into to the cell and between the membranes. Accordingly, there are two sets of streams, a concentrated stream which metal ions will be transported to through the membranes, and a second purified water stream from which the anions and cations are depleted. In desalination applications, the ions can include $Na^+$ and $Cl^-$, however other metal ions can be removed as well, for example Groups 1 and 2 of the periodic table including alkali metals and alkaline earth metals.

The membranes disclosed herein have high ion flux as well as selectivity along with good dimensional stability and mechanical properties in the presence of water. Accordingly, the membranes disclosed herein are especially useful for electrodialysis and electrodialysis desalination applications.

The area resistance can be determined by direct current (DC) measurements or by alternating current (AC) measurements. Resistance measured by DC is typically higher than resistance measured by AC, because resistance measured by DC includes boundary layer effects. Since boundary layer effects always exist in praxis, resistance data from DC method more closely represent the praxis performance.

Figure 2:
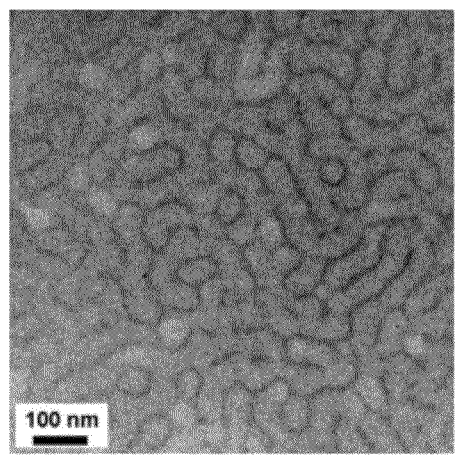
FIG. 2 illustrates a micrograph of a sulfonated block copolymer A-2.0 dried solution from N-methylpyrrolidone (NMP) at 1% wt.

The membrane resistance was measured by a direct current method using a set-up as illustrated in FIG. 1. The potential drop between the Haber-Luggin capillaries was measured with and without the membrane as a function of the current density. The resistance was determined from the slope of voltage vs. current. To obtain the membrane resistance, the resistance without the membrane was subtracted from the resistance with the membrane. FIG. 2 illustrates how to obtain membrane resistance. Membrane resistance is the difference in the slopes.

Membrane area resistance is dependent on thickness. Therefore, area resistance of membranes which differ in thickness cannot be compared. To obtain true membrane properties, membrane conductivity is often used. Membrane conductivity was calculated by dividing the membrane thickness by membrane area resistance.

"True" membrane permselectivity should be based on the measurement of ion concentration changes of both concentrate and dilute solutions by measuring the amount of current passing through the electrodialysis system. But this method is time consuming.

An alternative method is measuring "apparent" permselectivity, which is based on the measurement of the potential gradient across a membrane separating two electrolyte solutions of different concentrations. It is worthy to point out that the apparent permselectivity is always larger than the real permselectivity because it does not take boundary layer effects into account. However, the difference is generally small. The experiment set-up is schematically shown in FIG. 3.

The potential between two electrolyte solutions of different concentrations, i.e. membrane potential ($\phi_m$) was measured using a voltmeter. Membrane potential ($\phi_m$) can be expressed by the following equation:

$$\varphi_m = (2T_{cou} - 1)\frac{RT}{F}\operatorname{Ln}\frac{a1}{a2}$$

where $T_{cou}$ is the membrane transport number of the counter-ions, a1 and a2 are the activity of the two KCl solutions, R is the gas constant, and T is the temperature, and F is the Faraday constant. For a strictly permselective membrane (where $T_{cou}$ is 1), membrane potential is following:

$$\varphi_{m,sp} = \frac{RT}{F}\operatorname{Ln}\frac{a1}{a2}$$

The apparent permselectivity of a membrane ($\psi$), when measured in KCl solutions, is given by the following equation:

$$\psi = \frac{\varphi_m}{\varphi_{m,sp}}$$

In the example above, one side of the membrane is 0.1M KCl, the other side of the membrane is 0.5M KCl, and $\phi_{m,sp}$ is 36.2 mV. Therefore, the apparent permselectivity of a membrane can be calculated according to following equation:

$$\psi = \frac{\text{Measured } \varphi_m \text{ in mV}}{36.2 \text{ mV}}$$

Of course, other solutions and concentrations can be used too. But corrections need to be made for different concentrations as well as for difference in ion mobility in solutions.

Figure 4:
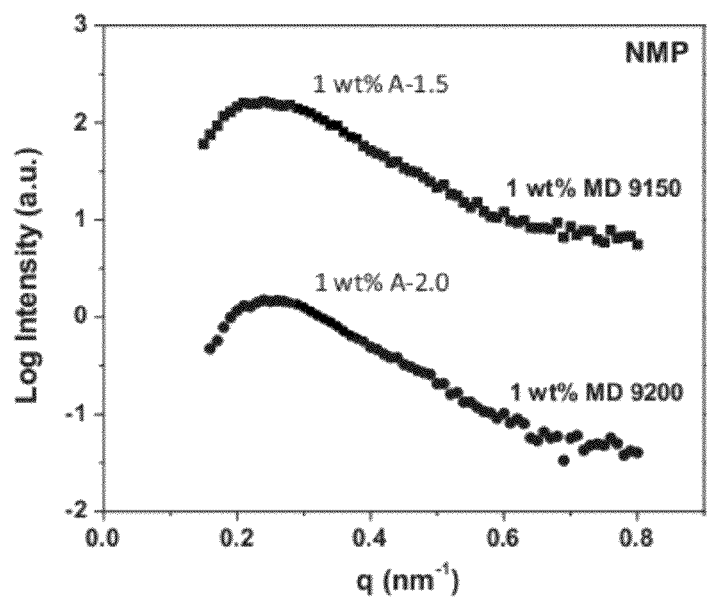
FIG. 4 illustrates X-ray scattering results for sulfonated block copolymers A-2.0 and A-1.5 in NMP at 1% wt solutions.
Figure 5:
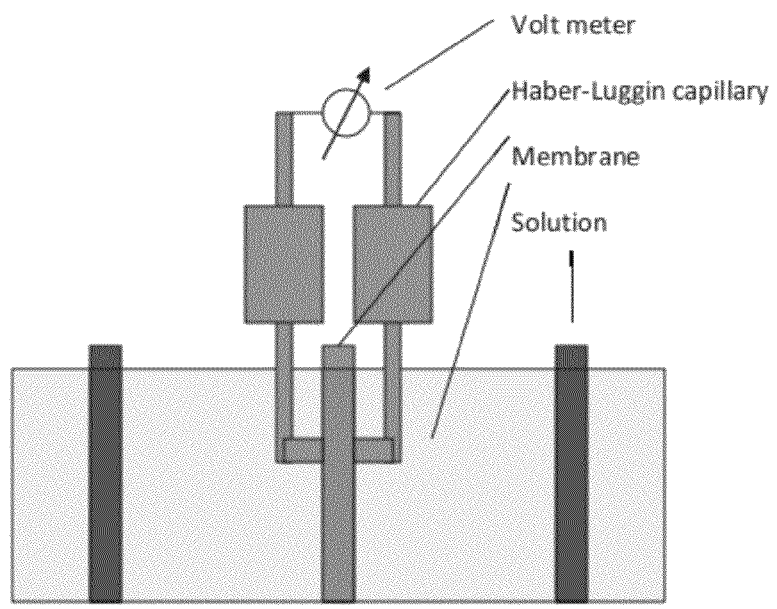
FIG. 5 is a schematic diagram of a set-up for measuring membrane resistance.
Figure 6:
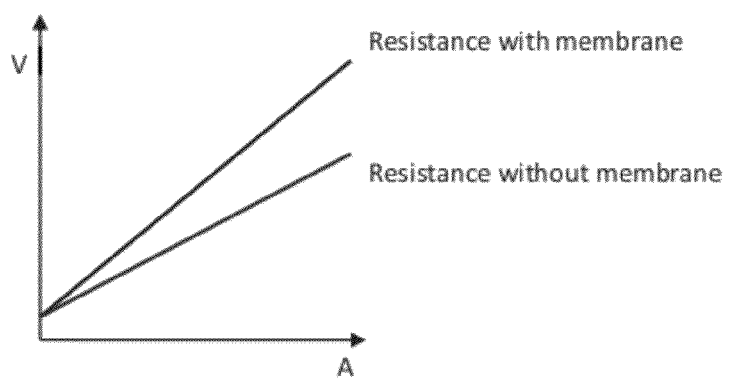
FIG. 6 illustrates how to obtain membrane resistance from measurements taken in a set-up according to FIG. 1.
Figure 7:
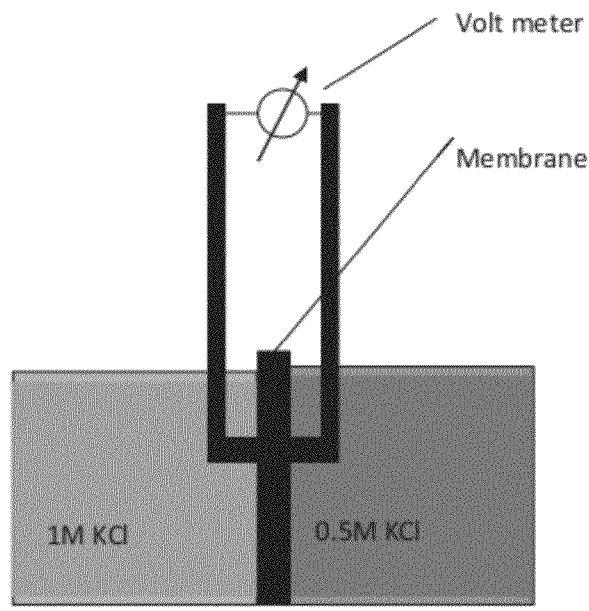
FIG. 7 schematically illustrates the experiment set-up for measuring the permselectivity.
Figure 8:
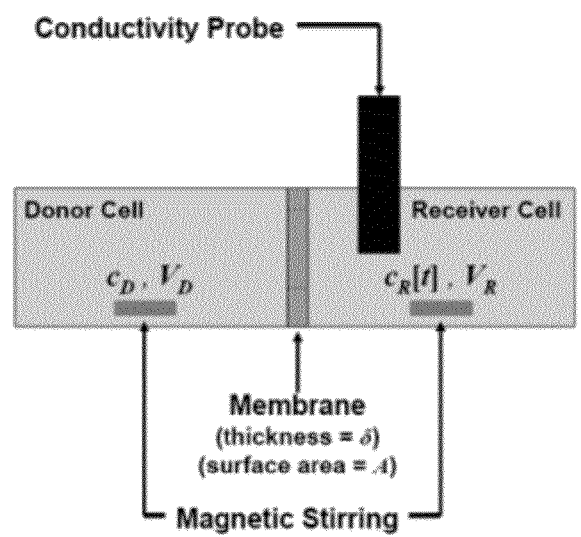
FIG. 8 schematically illustrates the experiment set-up for measuring the permeability.

The experimental set-up for measuring salt permeability is shown in the FIG. 4. The membrane was sandwiched between two cells: donor cell and receiving cell. The donor cell contained a salt solution with known concentration, and the receiving cell contained pure water at the start of the experiment. As salt permeated through the membrane from the donor cell to the receiving cell, the salt concentration in the receiving cell increased, and it was monitored by a conductivity probe over the time.

Salt permeability can be deducted from following equation, where $P_s$ is the salt permeability, t is the time, $V_R$ is the volume of the cells, $\delta$ is the membrane thickness, A is the membrane area, $C_D[0]$ is the starting salt concentration in the donor cell, and $C_R[t]$ is the salt concentration over the testing time in the receiving cell.

$$\ln\left[1 - \frac{2c_R[t]}{c_D[0]}\right]\left(\frac{-V_R\delta}{2A}\right) = P_s t$$

For some membranes, $P_s$ is dependent on the starting salt concentration ($C_D[0]$), therefore, $C_D[0]$ is often reported along with $P_s$. In our test, $C_D[0]$ was 2000 ppm NaCl. The experiment set-up for measuring the permeability is schematically shown in FIG. 4.

E. Examples

The following examples are intended to be illustrative only, and are not intended to be, nor should they be construed as, limiting the scope of the present disclosure in any way.

E.1 Methods

Mechanical properties, including Young's modulus, tensile strength, and elongation at break, in the dry state as described herein was measured according to ASTM D412.

Mechanical properties, including Young's modulus, tensile strength, and elongation at break, in the wet state as described herein was measured similar to the method according to ASTM D412 using samples that had been equilibrated under water for a period of 24 hours prior to testing, and that were fully submerged under water for testing.

All tensile data were collected in a climate controlled room at 74° F. (23.3° C.) and 50% relative humidity.

The % swelling as reported on the materials representative of the present disclosure was measured as follows. A dry swatch of film measuring approximately 9 in$^2$ was weighed and then placed in a jar with approximately 250 mL of distilled water. The swatch was allowed to hydrate for a period of at least 16 hrs. The swatch was then removed from the jar, both surfaces were blotted dry with an absorbent wipe for a period of several seconds, and the swatch was re-weighed. % swelling was calculated from the difference in the wet and dry weights divided by the original dry weight and multiplied by 100. Samples were run in at least duplicate.

The MVTR as described herein was measured similar to ASTM E 96B W. The ASTM method was modified by using a smaller vial, employing 10 ml of water, and having an area of exposed membrane of 160 mm$^2$ (as opposed to 3000 mm$^2$ recommended by the ASTM method). After adding the water and sealing the vial with the membrane test specimen, the vial was inverted and placed in a controlled environment chamber where air having a temperature of 25° C. and a relative humidity of 50% was blown across the membrane. Weight loss was measured versus time, and the water transport rate was calculated on the basis of the measurements as liter/m²/day. Measurements were typically taken over a period of 6-8 hours with multiple data points to insure linear transport behavior.

The degree of sulfonation as described herein and as determined by titration was measured by the following potentiometric titration procedure. The sulfonation reaction product solution was analyzed by two separate titrations (the "two-titration method") to determine the levels of styrenic polymer sulfonic acid, sulfuric acid, and non-polymeric by-product sulfonic acid (2-sulfoisobutyric acid). For each titration, an aliquot of about five (5) grams of the reaction product solution was dissolved in about 100 mL of tetrahydrofuran and about 2 mL of water and about 2 mL of methanol were added. In the first titration, the solution was titrated potentiometrically with 0.1 N cyclohexylamine in methanol to afford two endpoints; the first endpoint corresponded to all sulfonic acid groups in the sample plus the first acidic proton of sulfuric acid, and the second endpoint corresponded to the second acidic proton of sulfuric acid. In the second titration, the solution was titrated potentiometrically with 0.14 N sodium hydroxide in about 3.5:1 methanol:water to afford three endpoints: The first endpoint corresponded to all sulfonic acid groups in the sample plus the first and second acidic proton of sulfuric acid; the second endpoint corresponded to the carboxylic acid of 2-sulfoisobutyric acid; and the third endpoint corresponded to isobutyric acid.

The selective detection the of the second acidic proton of sulfuric acid in the first titration, together with the selective detection of the carboxylic acid of 2-sulfoisobutyric acid in the second titration, allowed for the calculation of acid component concentrations.

(b) Preparation of Non-Inverted Sulfonated Block Copolymers

A pentablock copolymer having the configuration A-D-B-D-A was prepared by sequential anionic polymerization where the A blocks are polymer blocks of para-tert-butylstyrene (ptBS), the D blocks were comprised of polymer blocks of hydrogenated isoprene (Ip), and the B blocks were comprised of polymer blocks of unsubstituted styrene (S). Anionic polymerization of the t-butylstyrene in cyclohexane was initiated using sec-butyllithium affording an A block having a molecular weight of 15,000 g/mol. Isoprene monomers were then added to afford a second block with a molecular weight of 9,000 g/mol (ptBS-Ip-Li). Subsequently, styrene monomer was added to the living (ptBS-Ip-Li) diblock copolymer solution and was polymerized to obtain a living triblock copolymer (ptBS-Ip-S-Li). The polymer styrene block was comprised only of polystyrene and had a molecular weight of 28,000 g/mol. To this solution was added another aliquot of isoprene monomer to obtain an isoprene block having a molecular weight of 11,000 g/mol. Accordingly, this afforded a living tetrablock copolymer structure (ptBS-Ip-S-Ip-Li). A second aliquot of para-tert butyl styrene monomer was added, and polymerization thereof was terminated by adding methanol to obtain a ptBS block having a molecular weight of about 14,000 g/mol. The ptBS-Ip-S-Ip-ptBS was then hydrogenated using a standard $Co^{2+}$/triethylaluminum method to remove the C=C unsaturation in the isoprene portion of the pentablock. The block polymer was then sulfonated directly (without further treatment, not oxidizing, washing, nor "finishing") using an i-butyric anhydride/sulfuric acid reagent. The hydrogenated block copolymer solution was diluted to about 10% solids by the addition of heptane (roughly an equal volume of heptane per volume of block copolymer solution).

Sufficient i-butyric anhydride and sulfuric acid (1/1 (mol/mol)) were added to afford the desired sulfonated functionality levels. The sulfonation reaction was terminated by the addition of ethanol (2 mol ethanol/mol of i-butyric anhydride). The resulting polymers were found, by potentiometric titration, to have an "Ion Exchange Capacity (IEC)" of 1.0, 1.5 and 2.0 meq of —$SO_3H$/g of polymer. These are shown in the following table 1:

TABLE 1

Sulfonated Block copolymer functionalities

| Polymer | Ion Exchange Capacity (IEC) |
|---|---|
| A-0 | 0 meq/g |
| A-0.4 | 0.4 meq/g |
| A-0.7 | 0.7 meq/g |
| A-1 | 1 meq/g |
| A-1.5 | 1.5 meq/g |
| A-2.0 | 2.0 meq/g |

The micellar solution of sulfonated polymer had a solids level of about 10%-wt. in a mixture of heptane, cyclohexane, and ethyl i-butyrate.

Films of the polymers A-1, A-1.5 and A-2.0 prepared as described above were cast on silicanized glass plates at room temperature in a box with a nitrogen purge. Films were allowed to dry in this manner for a period of at least 16 hours. No further post-treatments of the film were performed except those specifically required by particular testing procedures. Typical film thicknesses obtained by this procedure range from 1.0 to 2.0 mils.

E.3 Solubility of Sulfonated Block Polymers in Polar Solvents

The solubility of the cast films of the sulfonated polymers were tested in aprotic polar solvents. The test was conducted by placing single strip of film of polymer A-2.0, ⅛ inch by 1 inch in area with a thickness of 1 mil in a jar with about 20 ml of three different aprotic polar solvents. The mixture was allowed to stand at room temperature overnight. The following table shows the results:

TABLE 2

Solubility of unmodified sulfonated block copolymer films in aprotic polar solvents

| Exp No. | Polymer | Solvent | Solids Content |
|---|---|---|---|
| 1 | A-2.0 | DMF | no observed solubility; concentration substantially less than 1% |
| 2 | A-2.0 | DMP | no observed solubility; concentration substantially less than 1% |
| 3 | A-2.0 | DMA | concentration substantially less than 1% |

As noted in the above table, there was no observed solubility of the cast unmodified sulfonated block copolymers in solvents DMF and DMP. With respect to DMA, there was some very small amount of solubility, however the concentration of the solution was still substantially less than 1 wt %.

Additional tests were conducted for solubility of the polymer membranes in aprotic polar solvents. It was surprisingly found that the sulfonated block copolymer membrane can be dissolved when placed in a dried solvent and heated. Accordingly, prior to dissolving the test films, the DMA was dried using a molecular sieve. Subsequently, the sulfonated block copolymer films noted in Table 1 were cut into small pieces and placed into a bottle. The closed vessel was placed in a heated oven overnight. The following table summarizes the results:

TABLE 3

Solutions

| Exp. No. | Polymer | Solvent | Solids content (wt %) | Temperature (° C.) |
|---|---|---|---|---|
| 4 | A-1.5 | DMA | 1% | 50 |
| 5 | A-1.5 | NMP | 1% | 50 |
| 6 | A-0.4 | DMA | 5% | 60 |
| 7 | A-0.7 | DMA | 5% | 60 |
| 8 | A-1.0 | DMA | 5% | 60 |
| 9 | A-1.5 | DMA | 5% | 60 |
| 10 | A-2.0 | DMA | 5% | 60 |
| 11 | A-1.5 | DMA | 7.5% | 60 |
| 12 | A-2.0 | DMA | 7.5% | 60 |
| 13 | A-1.0 | DMA | 7.5% | 100 |
| 14 | A-1.5 | DMA | 10% | 60 |
| 15 | A-1.5 | DMA | 15% | 60 |

For the experiments shown in Table 3, each was dissolvable into the provided polar solvent. In particular, Exp. 4 and 5 at 1 wt % solids produced a clear solution. At 5 wt % solids content, shown in Exp. 6-10, a clear solution was also obtained but was opalescent, low in viscosity and free of particulates. These also were cast to a quality membrane with good properties, having clarity, uniformity in color and no gels or particles. At 7.5 wt % solids content, Exp. 11 was clear but markedly opalescent and was also cast to a quality membrane. Heating the samples to higher temperatures accelerate the dissolution of the films in the solvent. For example, samples at 100° C. produced identical solutions as those heated to 60° C. but required less time to dissolve. Accordingly, heating of the samples is limited only by the boiling point of the solvent used.

However, Exp. 14 and 15, at 10 wt % and 15 wt %, produced a solution that was opaque, white grease-like material. The product of Exp. 14 and 15 were cast to a membrane but had gel-like particles and low mechanical strength.

E.3 Structure of Dissolved Polymer

As discussed above sulfonated block copolymers have been previously prepared and dissolved in a cyclohexane or cyclohexane/heptane solution. In such a solution, the sulfonated block copolymers configure themselves into a micelle formation with the polar sulfonated styrene segments arranged in the interior (core) of the micelle, while the non-polar non-sulfonated styrene segments arranged on exterior (corona) of the micelle. However, after dissolving the sulfonated block copolymers in an aprotic polar solvent, the sulfonated block copolymers arranged themselves into the inverted micelle structure, wherein the polar sulfonated segments are on the exterior (corona) of the micelle and the non-polar non-sulfonated segments are arranged in the interior (core) of the micelle.

Such an inverted micelle structure is found in with the polar solutions disclosed herein. To confirm this, a test was carried out wherein a 10 ml of a 5 wt % solution of A-1.5 dissolved in DMA was placed in a small glass vial. Additionally, a second vial was made of A-1.5 dissolved in a cyclohexane/heptane mixture. A strong basic material, tri-s-butoxide aluminum ((s-BuO)$_3$Al; 98% pure), was added dropwise to both of these solutions. When the (s-BuO)$_3$Al was added to the solution containing the DMA dissolved polymer, an precipitate was afforded. However when the same reagent was added to the cyclohexane/heptane dissolved polymer, no precipitation was observed. Accordingly, such results demonstrate that although the same copolymer is in both solutions, the DMA dissolved polymer has a different structure than that in the cyclohexane/heptane mixture.

Further, the result is consistent with the dissolved sulfonated polymer micelles in DMA having the ionic segments on the outside of the micelle (thus "inverted"). The addition of the basic Al reagent causes the linking of micelles together via an ionic crosslinking reaction with the sulfonic acid sites on the corona of the micelle thereby causing precipitation of the polymer. The coagulation of the polymer in response to the addition of a strong base is evidence that the ionic segments are now on the outside of the micelle.

A further confirmatory test includes preparing a shallow pan having about 20 in$^2$ of surface water. Further, a drop of 5 wt % solution of A-1.5 in DMA is added to the water surface. When this was done, it was observed that the polymer spread rapidly across the entire water surface of the pan. While this DMA solution appeared to dissolve rapidly in the water, there was no evidence of film formation. With the addition of further drops, there was generated an opalescent/white water phase but no evidence of film was observed. Accordingly, the polymer spread rapidly on the water surface but did not form a film; rather an aqueous dispersion of the inverted micelles was the product of this experiment. In a comparative test, a solution of A-1.5 dissolved in cyclohexane was also added dropwise on the surface of water. In this case the droplet beaded together and did not disperse. This indicates that the A-1.5 polymer has a different structure in the DMA than when dissolved in cyclohexane. This is also consistent with the view that the polar sulfonated segments are on the exterior of the micelle when dissolved in DMA as such a structure would facilitate the spread across the water with the formation of an aqueous dispersion of inverted micelles and without film formation.

E.3 Properties

Films were prepared using the solutions of the sulfonated block copolymer dissolved in DMA to a 5 wt % solution. Additionally, a comparative set of films were prepared with sulfonated block copolymer dissolved in a cyclohexane/heptane mixture (CH/Hep) without any polar solvent. In order to form the films, the solutions were cast onto silicanized glass plates at room temperature in a box with a nitrogen purge and left to dry. Some of the properties of these cyclohexane films are summarized in Tables 3-6.

Shown in Tables 3 and 4 are results regarding MVTR (inverted cup method) and water uptake of films produced by each method.

TABLE 4

MVTR (Inverted Cup Method) and Swelling Results

| Exp. No. | Polymer | Solvent | Water Uptake (%) | MVTR (liter/m2/day) |
|---|---|---|---|---|
| 15 | A-2.0 | DMA | 256 | not measurable* |
| 16 | A-1.5 | DMA | 124 | 25 |
| 17 | A-1.0 | DMA | 9 | 26 |
| C-1 | A-2.0 | CH/Hep | 85 | 25 |
| C-2 | A-1.5 | CH/Hep | 38 | 21 |
| C-3 | A-1.0 | CH/Hep | 15 | 1 |

*MVTR was not measurable as the membrane was not sufficiently strong to maintain itself for the test.

Shown in Table 4 are the MVTR and Swelling (Water Uptake) results of the sulfonated block copolymer in DMA as well as CH/Hep solution. Both surprising and unexpected is the increase in MTVR shown for Exp. 15 and 16. The primary difference between these polymers is that the sulfonation levels are different. Namely, as IEC is reduced from 1.5 to 1.0, the MVTR increases from 25 liter/m2/day to 26 liter/m2/day. In comparison, Exp. C-2 and C-3, having polymer films cast from CH/Hep solutions showed a drop in MVTR. Namely, IEC is reduced from 1.5 to 1.5 for the polymers in Exp. C-2 and C-3. However, as IEC is reduced, the MVTR also decreases from 21 to 1. Accordingly, it is unexpected and surprising that for films cast from solutions having the polymer dissolved in a DMA solvent, there is very high MVTR even at functionalities of 1.0 IEC. Such properties also evidence that indeed such sulfonated polymer films cast from the DMA solutions have a different structure than those cast from the conventional CH/Hep solutions.

Moreover, the results are even further unexpected and surprising in view of the results obtained regarding water uptake. Water uptake (also known as swelling) is an indication of dimensional stability of the polymer membranes. Generally speaking, with increased water uptake the dimensional stability of the polymer decreases. Accordingly in applications where the film will be in the presence of water a more dimensionally stable film is desired.

As shown in Table 4, the polymer films cast from solvent containing DMA show low water uptake with very high MVTR values. For example, Exp. 17 shows polymer A-1.0 with an IEC of 1.0 having a water uptake of only 9%. This low water uptake value is achieved while at the same time having a MVTR of 25 liter/m²/day. On the other hand the comparative data shows different results. For example, Exp. C-2 shows a water uptake of 38% with an MVTR of 21 liter/m²/day. Thus, C-2 has a lower MVTR while at the same time having a water uptake of more than 4 times that in Exp. 17. Moreover, Exp. C-3, where the polymer has an IEC of 1.0, is closer to that in Exp. 17 having a water uptake of 15%. However, despite this low water uptake value, Exp. C-3 has an MVTR of only 1 liter/m²/day, and therefore is not nearly as good at transporting water.

Therefore, the data shown in Table 4 shows two different trends. Namely, Exp. 15-17 according to several embodiments of the invention show that as IEC decreases from 2.0 to 1.0 the MVTR remains at a high rate, while at the same time the water uptake decreases to a very low percentage. On the other hand, Exp. C-1 through C-3 show that as IEC decreases from 2.0 to 1.0, even though the swelling uptake decreases, the MVTR decreases significantly. Thus, in the comparative examples, the MVTR declines significantly as water uptake declines. However, surprisingly, the examples according to the invention disclosed herein show no corresponding decrease in MVTR as water uptake decreases and as IEC decreases. Accordingly, by dissolving sulfonated polymer in DMA, a polymer membrane is achievable which has excellent dimensional stability, while at the same time having a demonstrably high MVTR.

Tables 5 and 6 demonstrate the mechanical properties of the membranes cast from DMA solution as well as CH/Hep solution. Shown is that the membranes cast from DMA solutions exhibit good mechanical strength sufficient for many applications. Moreover, the properties of the membranes cast from the DMA solutions are different than that from CH/Hep solutions thus further confirming that the structures of the membranes are different.

TABLE 5

Sulfonated block copolymer membrane cast from a 5 wt % solution in DMA.

| Exp No. | Polymer | Solvent | State | Modulus (psi) | Tensile @ yield (psi) | Elongation @ Yield (%) | Tensile @ Break (psi) | Elongation @ Break (%) |
|---|---|---|---|---|---|---|---|---|
| 18 | A-2.0 | DMA | Dry | 55,000 | 1,500 | 4 | 1,100 | 57 |
| 19 | A-2.0 | DMA | Wet | n/a* | n/a* | — | 0 | 0 |
| 20 | A-1.5 | DMA | Dry | 47,000 | 1,700 | 5 | 1,200 | 45 |
| 21 | A-1.5 | DMA | Wet | 3,000 | 500 | 100 | 500 | 100 |
| 22 | A-1.0 | DMA | Dry | 70,000 | 2,100 | 5 | 1,700 | 100 |
| 23 | A-1.0 | DMA | Wet | 32,000 | 900 | 6 | 1,100 | 80 |

1) The test condition was either "Dry"—relative humidity 50% or "Wet"—Immersed in water; MD = machine direction and TD = transverse direction.
2) *MVTR was not measurable as the membrane was not sufficiently strong to maintain itself for the test.

TABLE 6

Sulfonated block copolymer membrane cast from a solution in a cyclohexane/heptane solvent blend

| Exp No. | Polymer | Solvent | State | Modulus (psi) | Tensile @ yield (psi) | Elongation @ Yield (%) | Tensile @ Break (psi) | Elongation @ Break (%) |
|---|---|---|---|---|---|---|---|---|
| C-4 | A-2.0 | CH/Hep | Dry | 49,000 | 1,300 | 4.5 | 100 | 57 |
| C-5 | A-2.0 | CH/Hep | Dry | 58,000 | 1,600 | 4 | 1,100 | 60 |
| C-6 | A-2.0 | CH/Hep | Wet | 4,000 | No Yield | — | 600 | 90 |
| C-7 | A-1.5 | CH/Hep | Dry | 70,000 | 1,900 | 4 | 1,400 | 100 |
| C-8 | A-1.5 | CH/Hep | Wet | 11,000 | No Yield | 3.7 | 500 | 70 |
| C-9 | A-1.0 | CH/Hep | Dry | 100,000 | 2,300 | 9 | 1,900 | 7 |
| C-10 | A-1.0 | CH/Hep | Wet | 30,000 | 1,700 | 304 | 1,600 | 190 |
| C-11 | A-0.7 | CH/Hep | Dry | 130,000 | 2,900 | 7.7 | 2,300 | 100 |
| C-12 | A-0.7 | CH/Hep | Wet | 30,000 | 1,900 | | 1,900 | 230 |

As shown in Table 5, Exp. 18 a trend is shown for the "wet" polymer is that as functionality decreases (IEC decreases) the modulus increases, thus indicating a stiffer membrane. Moreover, Table 5 indicates elongation is slightly lower than the polymer formed from CH/Hep solutions however these are still within acceptable ranges. Furthermore the ranges for tensile strength shown in Table 5 are also sufficient for many applications. Moreover, the tensile strength and modulus increase as the functionality decreases. Accordingly, membranes cast from DMA solutions show that a membrane can be formed which has high MVTR, good dimensional stability, and as evidenced by Table 5, also has good mechanical properties.

The membranes cast from the inverted micelle solutions can also be used in applications such as electrodialysis. In order to test the effectiveness of the membranes discussed above for electrodialytic applications, a charge was applied to the membranes and both the selectivity and conductivity were tested. The results are shown in Table 7.

Exp. 24, the specific conductivity of the membrane is 2.6 mS/cm, while the selectivity is also high at 94.40. Further, these results were achieved with low water uptake of 20.2%, thus showing high ion flux while maintaining dimensional stability. On the other hand comparative polymer of Exp. No. C-13 shows a very low specific conductivity of 00.7 mS/cm and 0.017 mS/cm (after $H_2SO_4$ treatment) and with a higher water uptake of 27.4. Accordingly, the polymer cast from aprotic polar solvent as disclosed herein has surprisingly high conductivity. Additionally, Exp. 25 with polymer A-1.5 (having an IEC of 1.5), has an especially high conductivity of 10.6 mS/cm.

In Exp. 28, combinations of membranes having different IEC's were dissolved in solvent, producing a conductivity of 2.3—similar to that of Exp. 24

Such high conductivities along with low water uptake demonstrate the membranes are especially useful for electrodia- TABLE 7a Electrodialysis

| Exp No. | Polymer | Solvent | PS % | RA (W cm2) | thickness (μm) | Specific conductivity (mS/cm) | water uptake (%) |
|---|---|---|---|---|---|---|---|
| C-13 | A-1.0 | CH | 8.10 | 571 | 35 | 0.007 | 27.4 |
| C-13* | | | 99.02 | 187 | 30.8 | 0.017 | |
| 24 | A-1.0 | DMA | 94.40 | 0.66 | 15 | 2.6 | 20.2 |
| 25 | A-1.5 | DMA | 83.64 | 0.17 | 17 | 10.6 | 132 |
| 26 | A-2.0 | DMA | N/A | N/A | 8.6 | | |
| 27 | A-0.4 + A-1.5 | DMA | 97.13 | 10.23 | 49 | 0.56 | 41.9 |
| 28 | A-0.7 + A-1.5 | DMA | 96.86 | 1.06 | 23 | 2.3 | 33.8 |
| 28* | | DMA | 94.97 | 1.09 | | 2.2 | |
| 29 | A-1.0 + 1.5 | CH | 98.21 | 44.41 | 35 | 0.094 | 43.76 |
| 29* | | CH | 97.67 | 14.14 | | 0.27 | |

*Repeated example after treatment with $H_2SO_4$ (10% relative humidity, 12 Hours), then washing with water.
PS is the selectivity; RA is the charge applied, Specific Conductivity indicates the conductivity of the membrane.

As shown in Table 7a, the membranes cast from aprotic polar solvents as disclosed herein surprisingly have especially high specific conductivity as well as selectivity while still maintaining low water uptake. For example, as shown in lytic applications, including desalination. Such results indicate that the membranes could be effectively used for removing unwanted ions from the water while maintaining structural integrity.

TABLE 7b

| | | | | | | | | | Film Properties | |
|---|---|---|---|---|---|---|---|---|---|---|

| Exp No. | Sample ID | Casting Solvent | IEC* meq g$^{-1}$ | Membrane Thickness μm | Water Uptake** wt % | Area Resistance*** Ω cm$^2$ | Conductivity*** mS/cm (0.5M NaCl) | Perm-selectivity % (0.1M/0.5M KCl) | NaCl Permeability cm$^2$/sec (2000 ppm) |
|---|---|---|---|---|---|---|---|---|---|
| C-14 | A-1.0 | CH/Hep | 1.0 | 35 | NA | 187.0 | 0.00 | 99.0% | 5.3E−10 |
| 30 | A-1.0 # | DMA | 1.0 | 18 | 26 | 0.7 | 2.70 | 93.8% | 4.1E−09 |
| 31 | A-1.0 | DMA | 1.0 | 15 | 26 | 0.7 | 2.10 | 95.1% | NA |
| 32 | A-1.0 # | Toluene | 1.0 | 103 | 13 | 33.8 | 0.30 | 99.6% | 2.0E−09 |
| 33 | A-1.0 | Toluene | 1.0 | 85 | NA | 17.1 | 0.50 | NA | NA |
| C-15 | A-1.0 | CH/Hep | 1.0 | 35 | NA | 187 | 0.02 | 99.0% | NA |
| 34 | A-1.0 | DMA | 1.0 | 44 | 33 | 2.6 | 1.70 | 95.8% | NA |
| 35 | A-1.5 | DMA | 1.5 | 30 | 118 | 0.3 | 10.00 | 84.0% | NA |
| 36 | A-1.5 | DMA | 1.5 | 30 | 94 | 0.32 | 9.40 | 84.5% | NA |
| C-16 | A-2.0 | CH/Hep | 2.0 | 35 | 203 | 0.2 | 15.00 | 89.0% | NA |
| C-17 | A-2.0 | CH/Hep | 2.0 | 33 | NA | 0.3 | 11.40 | 87.5% | NA |
| C-18 | A-2.0 | CH/Hep | 2.0 | 60 | 90 | 0.6 | 9.10 | 80.2% | 7.9E−08 |
| C-19 | A-2.0 | CH/Hep | 2.0 | 27 | NA | 0.4 | 7.30 | NA | NA |

TABLE 7b-continued

| | | | | | | | | Perm-selectivity | NaCl |
| | | | | | | | | % | Permeability |
| Exp | Sample | Casting | IEC* meq g$^{-1}$ | Membrane Thickness μm | Water Uptake** wt % | Area Resistance*** Ω cm$^2$ | Conductivity*** mS/cm (0.5M NaCl) | (0.1M/0.5M KCl) | cm$^2$/sec (2000 ppm) |
|---|---|---|---|---|---|---|---|---|---|
| C-20 | A-2.0 | CH/Hep | 2.0 | 35 | 203 | 0.24 | 15.00 | 89.0% | NA |
| 37 | A-2.0 supported | DMA | 2.0 | 49 | 147 | 0.23 | 21.00 | NA | NA |

NA = Not Analyzed
*Ion Exchange Coefficient
**H+-form, in water at 25° C., reference membrane dried at room temperature and 50% r.h.
***in Na+-form at T = 25° C. in 0.5M NaCl, 2-electrode set-up Similarly to Table 7a, Table 7b shows membranes cast from aprotic polar solvents have especially high specific conductivity and selectivity while having low water uptake. On the other hand, the membranes cast from CH/Hep show either too low conductivity, or when conductivity is raised the water uptake values become unacceptably high. For instance, Exp. Nos. C-14 and C-15 which are cast from CH/Hep and have an IEC of 1.0 produce unacceptably low conductivities. However, when the IEC is increased to 2.0, the conductivity is improved but, water uptake values become too high. For example, Exp. Nos. C-16 and C-20 have high conductivity, but the water uptake values exceed 200%. Alternatively, membranes cast from aprotic polar solvents improves such properties such that high conductivity and low water uptake is achievable. For instance as shown in examples 30-34, good conductivity is shown, while water uptake values are all below 40%. Accordingly, surprisingly advantageous properties are obtained from membranes cast from aprotic polar solvents.

What is claimed is:

1. A solution having an inverted micelle sulfonated block copolymer composition comprising:
   at least one sulfonated block copolymer having at least one end block A and at least one interior block B wherein each A block contains essentially no sulfonic acid or sulfonate ester functional groups and each B block is a polymer block containing from about 10 to about 100 mol % sulfonic acid or sulfonate ester functional groups based on the number of sulfonation susceptible monomer units of the B block,
   said sulfonated block copolymer being dissolved in an aprotic polar solvent, and
   wherein the sulfonated block copolymer is arranged in an inverted micelle structure having the sulfonic acid or sulfonate ester segments of the sulfonated block copolymer on the exterior of said micelle structure and the non-polar segments of the sulfonated block copolymer on the interior of said micelle structure, and
   wherein the aprotic polar solvent is a compound containing at least one nitrogen atom.

2. The solution of claim 1, wherein the concentration of the sulfonated block copolymer in the solution is less than 15 wt %.

3. The solution of claim 1, wherein the ion exchange capacity is about 2 meq/g or less.

4. The solution of claim 1, wherein the ion exchange capacity is about 1.6 meq/g or less.

5. An aqueous dispersion formed from the solution of claim 1.

6. The solution of claim 1, wherein the sulfonated block copolymer has a general configuration A-B-A, A-B-A-B-A, (A-B-A)$_n$X, (A-B)$_n$X, A-D-B-D-A, A-B-D-B-A, (A-D-B)$_n$X, (A-B-D)$_n$X or mixtures thereof, where n is an integer from 2 to about 30, and X is a coupling agent residue and wherein each D block is a polymer block resistant to sulfonation and the plurality of A blocks, B blocks, or D blocks are the same or different.

7. The solution of claim 1, wherein each D block of the sulfonated block copolymer is selected from the group consisting of (i) a polymerized or copolymerized conjugated diene selected from isoprene, 1,3-butadiene having a vinyl content prior to hydrogenation of between 20 and 80 mol percent, (ii) a polymerized acrylate monomer, (iii) a silicon polymer, (iv) polymerized isobutylene and (v) mixtures thereof, wherein any segments containing polymerized 1,3-butadiene or isoprene are subsequently hydrogenated.

8. A sulfonated block copolymer composition formed by the process comprising:
   dissolving in an aprotic polar solvent a sulfonated block copolymer having at least one end block A and at least one interior block B wherein each A block contains essentially no sulfonic acid or sulfonate ester functional groups and each B block is a polymer block containing from about 10 to about 100 mol % sulfonic acid or sulfonate ester functional groups based on the number of sulfonation susceptible monomer units of the B block,
   wherein the sulfonated block copolymer in said solvent is arranged in an inverted micelle structure having the sulfonic acid or sulfonate ester segments of the sulfonated block copolymer on the exterior of said micelle structure and the non-polar segments of the sulfonated block copolymer on the interior of said micelle structure, and
   wherein the aprotic polar solvent is a compound containing at least one nitrogen atom.

9. The composition of claim 8, wherein dissolving the sulfonated block copolymer in the aprotic polar solvent comprises heating the sulfonated block copolymer and the aprotic polar solvent at a temperature ranging from 40° C. to the boiling point of the aprotic polar solvent.

10. The composition of claim 8, wherein the aprotic polar solvent is an amide.

11. The composition of claim 8, wherein the aprotic polar solvent is N,N-dimethylformamide (DMF), N,N-dimethylacetamide (DMA), N-methyl-2-pyrrolidone (NMP).

12. The composition of claim 8, wherein the ion exchange capacity is about 2 meq/g or less.

13. The composition of claim 8, wherein the ion exchange capacity is about 1.6 meq/g or less.

14. The composition of claim 8, wherein the sulfonated block copolymer is dissolved in the polar aprotic solvent at less than 15 wt %.

15. An aqueous dispersion formed with the sulfonated block copolymer composition of claim 8.

16. The composition of claim 8, wherein the sulfonated block copolymer has a general configuration A-B-A, A-B-A-B-A, (A-B-A)$_n$X, (A-B)$_n$X, A-D-B-D-A, A-B-D-B-A, (A-D-B)$_n$X, (A-B-D)$_n$X or mixtures thereof, where n is an integer from 2 to about 30, and X is a coupling agent residue and wherein each D block is a polymer block resistant to sulfonation and the plurality of A blocks, B blocks, or D blocks are the same or different.

17. A sulfonated block copolymer composition comprising:
at least one end block A and at least one interior block B wherein each A block contains essentially no sulfonic acid or sulfonate ester functional groups and each B block is a polymer block and having an ion exchange capacity of 1.5 meq/g or less,
and wherein said block copolymer has an inverted cup moisture transmission rate greater than about 20 liters/ m$^2$/day; and
wherein the sulfonated block copolymer is dissolved in an aprotic polar solvent and the sulfonated block copolymer in said solvent is arranged in an inverted micelle structure having the sulfonic acid or sulfonate ester segments of the sulfonated block copolymer on the exterior of said micelle structure and the non-polar segments of the sulfonated block copolymer on the interior of the said micelle structure; and
wherein the aprotic polar solvent is a compound containing at least one nitrogen atom.

18. An aqueous dispersion formed with the sulfonated block copolymer composition of claim 17.

* * * * *